(12) United States Patent
Liu et al.

(10) Patent No.: US 12,657,824 B2
(45) Date of Patent: Jun. 16, 2026

(54) SYSTEMS AND METHODS FOR FACE ASSET CREATION AND MODELS FROM ONE OR MORE IMAGES

(71) Applicant: University of Southern California, Los Angeles, CA (US)

(72) Inventors: Shichen Liu, Los Angeles, CA (US); Yunxuan Cai, Los Angeles, CA (US); Yajie Zhao, Los Angeles, CA (US); Bipin Kishore, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 270 days.

(21) Appl. No.: 18/472,826

(22) Filed: Sep. 22, 2023

(65) Prior Publication Data

US 2024/0119671 A1    Apr. 11, 2024

Related U.S. Application Data

(60) Provisional application No. 63/376,704, filed on Sep. 22, 2022, provisional application No. 63/376,701, filed on Sep. 22, 2022.

(51) Int. Cl.
G06T 17/20 (2006.01)
G06T 7/40 (2017.01)
(Continued)

(52) U.S. Cl.
CPC ............... G06T 17/20 (2013.01); G06T 7/40 (2013.01); G06T 7/60 (2013.01); G06T 7/70 (2017.01);
(Continued)

(58) Field of Classification Search
None
See application file for complete search history.

(56) References Cited

U.S. PATENT DOCUMENTS

| | | | |
|---|---|---|---|
| 2019/0360993 A1* | 11/2019 | Loupis ................ | A61K 31/352 |
| 2020/0082572 A1* | 3/2020 | Beeler .................. | G06T 15/506 |

(Continued)

OTHER PUBLICATIONS

Ackermann et al., "A survey of photometric stereo techniques", Foundations and Trends in Computer Graphics and Vision, 2013, pp. 149-254, vol. 3-4(2013).
(Continued)

*Primary Examiner* — Anh-Tuan V Nguyen
(74) *Attorney, Agent, or Firm* — Pillsbury Winthrop Shaw Pittman, LLP

(57) ABSTRACT

Methods, mediums, and systems for constructing a 3D face model, including Deep Iterative Face Fitting (DIFF) and Recurrent Feature Alignment (ReFA). A processor provides a reference—containing a 3D mesh representing a median face, vertex positions, or surface points—as a template and UV texture mapping pointing the 3D mesh to a 2D UV space; receives input image(s) of a face and extracts geometry/texture features in an image space; extracts features in a UV space; iteratively produces a feature map via visual semantic correlation between UV and image spaces and regress geometry updates, predicting texture maps and comparing features, and inputs the map to an RNN-based neural optimizer of Gated Recurrent Units (GRU) to determine a hidden state. A head pose and/or updated 3D mesh/UV-space position map is output, each pixel in the UV-space map storing a coordinate of a corresponding point in a canonical space of the 3D mesh.

22 Claims, 24 Drawing Sheets

(51) Int. Cl.
  *G06T 7/60* (2017.01)
  *G06T 7/70* (2017.01)
(52) U.S. Cl.
  CPC .............. *G06T 2207/10024* (2013.01); *G06T 2207/20084* (2013.01)

(56) References Cited

U.S. PATENT DOCUMENTS

| | | | | |
|---|---|---|---|---|
| 2020/0312008 A1* | 10/2020 | Cowburn | ............. | G06V 30/274 |
| 2021/0279956 A1* | 9/2021 | Chandran | ................ | G06T 17/20 |
| 2021/0390751 A1* | 12/2021 | Sagar | ..................... | G06T 15/503 |
| 2022/0036127 A1* | 2/2022 | Lin | .......................... | G06T 11/00 |
| 2022/0065620 A1* | 3/2022 | Fanello | ............. | G01B 11/2513 |
| 2022/0237843 A1* | 7/2022 | Saragih | ................. | G06T 15/506 |
| 2022/0343601 A1* | 10/2022 | Liaudanskas | ........... | G06T 15/04 |
| 2022/0351390 A1* | 11/2022 | Zhao | .................... | G06N 3/0464 |
| 2023/0080133 A1* | 3/2023 | Meier | ................... | G08G 1/166 |
| | | | | 382/103 |

OTHER PUBLICATIONS

Amberg et al., "Expression invariant 3D face recognition with a morphable model", In 2008 8th IEEE International Conference on Automatic Face & Gesture Recognition, 2008, pp. 1-6.
Bai et al., "Deep facial non-rigid multi-view stereo", In Proceedings of the IEEE/CVP Conference on Computer Vision and Pattern Recognition, 2020, pp. 5850-5860.
Bas et al., "What does 2D geometric information really tell us about 31) face shape?," International Journal of Computer Vision, Jul. 30, 2019, pp. 1455-1473.
Beeler et al., "High quality single-shot capture of facial geometry", In ACM Transactions on Graphics (1OG), 2010, pp. 1-9.
Beeler et al., "High-quality passive facial performance capture using anchor frames", In ACM SIGGRAPN 2011 papers, 2011, pp. 1-10.
Blanz et al., "A morphable model for the synthesis of 3D faces", In Proceedings of the 26th annual conference on Computer graphics and interactive techniques, 1999, pp. 187-194.
Bleyer et al., " Patchmatch stereo-stereo matching with slanted support windows", In BMVC, 2011, p. 1.
Bolkart et al., "A groupwise multilinear correspondence optimization for 3d faces", In Proceedings of the IEEE international conference on computer vision, 2015, pp. 3604-3612.
Borshukov et al., "Universal capture-image-based facial animation for 'The Matrix Reloaded'", In ACM Siggraph 2005 Courses, 16-es, p. 1.
Chang et al., "Pyramid stereo matching network", In Proceedings of the IEEE conference on computer vision and pattern recognition, 2018, pp. 5410-5418.
Debevec et al., "Acquiring the reflectance field of a human face", In Proceedings of the 27th annual conference on Computer graphics and interactive techniques, 2000, pp. 145-156.
Fyffe et al., "Multi-View Stereo on Consistent Face Topology", In Computer Graphics Forum, Wiley Online Library, 2017, pp. 295-309, vol. 36.
Gallup et al., "Real-time plane-sweeping stereo with multiple sweeping directions", In 2007 IEEE Conference on Computer Vision and Pattern Recognition, Jun. 2007, pp. 1-8.
Graham et al., "Measurement-based synthesis of facial microgeometry", In Computer Graphics Forum, Wiley Online Library, 2001, pp. 335-344, vol. 32.
Gu et al., "Cascade cost volume for high-resolution multi-view stereo and stereo matching", In Proceedings of the IFPF/CVFConference on Computer Vision and Pattern Recognition, Jun. 5, 2020, pp. 2495-2504.
He et al., "Deep residual learning for image recognition", In Proceedings of the IEEE conference on computer vision and pattern recognition, 2016, pp. 770-778.

Huang et al., "Deepmvs: Learning multi-view stereopsis", In Proceedings of the IEEE Conference on Computer Vision and Pattern Recognition, Apr. 2, 2018, pp. 2821-2830.
Im et al., "Dpsnet: End-to-end deep plane sweep stereo", arXiv preprint arXiv:1905.00538, 2019, pp. 1-12.
Ji et al., "Surfacenet: An end-toend 3d neural network for multiview stereopsis", In Proceedings of the IEEE international Conference on Computer Vision, Aug. 5, 2017, pp. 2307-2315.
Kang et al., Handling occlusions in dense Multiview stereo. In Proceedings of the 2001 IEEE Computer Society Conference on Computer Vision and Pattern Recognition. 2001, pp. 103-110, vol. 1.
Laga et al., "A survey on deep learning techniques for stereo-based depth estimation", IEEE Transactions on Pattern Analysis and Machine intelligence, Apr. 2022, pp. 1738-1764, vol. 44(4).
Li et al., "Robust single-view geometry and motion reconstruction", ACM Transactions on Graphics, 2009, pp. 1-10.
Li et al., "Learning formation of physicallybased face attributes", In Proceedings of the IFPFICVF conference on computer vision and pattern recognition, 2009, pp. 3410-3419.
Li et al., "Topologically Consistent Multi-View Face Inference Using Volumetric Sampling", In Proceedings of the IFFP/CVP International Conference on Computer Vision, Oct. 6, 2021, pp. 3824-3834.
Ma et al., "A highresolution geometry capture system for facial performance", In ACM SIGGRAPH, 2008, p. 1.
Schonberger et al., "Pixelwise view selection for unstructured multi-view stereo", In European Conference on Computer Vision, Springer, 2016, pp. 501-518.
Strecha et al., "Wide-baseline stereo from multiple views: a probabilistic account", In Proceedings of the 2004 IEEE Computer Society Conference on Computer Vision and Pattern Recognition, 2004, CVPR 2004, pp. 1-8, vol. 1.
Strecha et al., "Combined depth and outlier estimation in multi-view stereo", In 2006 IEEE Computer Society Conference on Computer Vision and Pattern Recognition, 2006, pp. 2394-2401, vol. 2.
Teed et al., "RAFT: Recurrent All-Pairs Field Transforms for Optical Flow", arXiv preprint arXiv:2003.12039, Aug. 25, 2020.
Ummenhofer et al., "Demon: Depth and motion network for learning monocular stereo", In Proceedings of the IEEE conference on computer vision and pattern recognition, Apr. 11, 2017, pp. 5038-5047.
Van Der Maaten et al., "Visualizing data using t-SNE", Journal of Machine Learning Research Nov. 8, 2008, pp. 2579-2605.
Wang et al., "ESRGAN: Enhanced super-resolution generative adversarial networks", In The European Conference on Computer Vision Workshops (ECCVW), Sep. 17, 2018, pp. 1-23.
Yariv et al., "Multiview neural surface reconstruction by disentangling geometry and appearance", Advances in Neural Information Processing Systems, 2020, pp. 2492-2502.
Zhang et al., "Functional faces: Groupwise dense correspondence using functional maps", In Proceedings of the IEEE Conference on Computer Vision and Pattern Recognition, 2016, pp. 5033-5041.
Blanz et al., "Face recognition based on fitting a 3d morphable model. IEEE Transactions on pattern analysis and machine intelligence", IEEE Transactions on Pattern Analysis and Machine Intelligence, Sep. 2003, pp. 1063-1074, vol. 25(9).
Booth et al., "A 3d morphable model learnt from 10,000 faces", In Proceedings of the IEEE Conference on Computer Vision and Pattern Recognition, 2016, pp. 5543-5552.
Cao et al., "Facewarehouse: A 3d facial expression database for visual computing", IEEE Transactions on Visualization and Computer Graphics, Mar. 2014, pp. 413-425, vol. 20(3).
Chen et al., "Photo-realistic facial details synthesis from single image", In Proceedings of the IEEE/CVF International Conference on Computer Vision, Dec. 3, 2019, pp. 9429-9439.
Cho et al., "Learning phrase representations using RNN encoder-decoder for statistical machine translation", In Proceedings of the 2014 Conference on Empirical Methods in Natural Language Processing (EMNLP), Association for Computational Linguistics, Oct. 25, 2014, pp. 1724-1734.
Deng et al., "Accurate 3d face reconstruction with weakly-supervised learning: From single image to image set", In Proceed-

(56) References Cited

OTHER PUBLICATIONS ings of the IEEE/CVF Conference on Computer Vision and Pattern Recognition Workshops, 2019, pp. 1-11.

Dib et al., "Practical face reconstruction via differentiable ray tracing", In Computer Graphics Forum, Wiley Online Library, Jan. 13, 2021, pp. 153-164.

Dib et al., "Towards high fidelity monocular face reconstruction with rich reflectance using self-supervised learning and ray tracing", arXiv preprint arXiv:2103.15432, 2021, pp. 1-20.

Egger et al., "3d morphable face models—past, present, and future", ACM Transactions on Graphics (TOG), Apr. 16, 2020, vol. 39(5), pp. 1-38.

Feng et al., "Learning an animatable detailed 3d face model from in-the-wild images", ACM Transactions on Graphics (TOG), Aug. 2021, pp. 1-13, vol. 40(4).

Garrido et al., "Reconstruction of personalized 3d face rigs from monocular video", ACM Transactions on Graphics (TOG), 2016, pp. 1-15, vol. 35(3).

Gecer et al., "Ganfit: Generative adversarial network fitting for high fidelity 3d face reconstruction", In Proceedings of the IEEE/CVF Conference on Computer Vision and Pattern Recognition, 2019, pp. 1155-1164.

Genova et al., "Unsupervised training for 3d morphable model regression", In Proceedings of the IEEE Conference on Computer Vision and Pattern Recognition, Jun. 15, 2018, pp. 8377-8386.

Ghosh et al., "Multiview face capture using polarized spherical gradient illumination", ACM Transactions on Graphics (TOG), 2011, pp. 1-10, vol. 30(6).

Guo et al., "Towards fast, accurate and stable 3d dense face alignment", In Computer Vision-ECCV 2020: 16th European Conference, Glasgow, UK, Proceedings, Part XIX 16, Aug. 23, 2020, pp. 152-168.

Huynh et al., "Meso-scopic facial geometry inference using deep neural networks", In Proceedings of the IEEE Conference on Computer Vision and Pattern Recognition, 2018, pp. 4321-4330.

Jackson et al., "Large pose 3d face reconstruction from a single image via direct volumetric cnn regression", In Proceedings of the IEEE International Conference on Computer Vision, 2017, pp. 1031-1039.

Lattas et al., "Avatarme: Realistically renderable 3d facial reconstruction in-the-wild", In Proceedings of the IEEE/CVF Conference on Computer Vision and Pattern Recognition, 2020, pp. 760-769.

Legendre et al., "Efficient multispectral facial capture with monochrome cameras", In Color and Imaging Conference, Aug. 2018, pp. 1-8.

Levine et al., State-of-the-art of 3d facial reconstruction methods for face recognition based on a single 2d training image per person, Pattern Recognition Letters, Mar. 29, 2009, pp. 908-913, vol. 30(10).

Li, Jiaman, et al., "Dynamic facial asset and rig generation from a single scan", ACM Trans. Graph., Oct. 5, 2020, pp. 1-18, vol. 39(6).

Li, Tianye, et al., Learning a model of facial shape and expression from 4d scans. ACM Trans. Graph., Nov. 2017, pp. 194-1:194-17, vol. 36(6).

Ruan et al., Sadrnet: Selfaligned dual face regression networks for robust 3d dense face alignment and reconstruction, IEEE Transactions on Image Processing, Jun. 6, 2021, pp. 1-13.

Lin et al., "Meingame: Create a game character face from a single portrait", arXiv preprint arXiv:2102.02371, Feb. 7, 2021, pp. 1-9.

Luo et al., "Normalized avatar synthesis using stylegan and perceptual refinement", In Proceedings of the IEEE/CVF Conference on Computer Vision and Pattern Recognition, Jun. 21, 2021, pp. 11662-11672.

Ma et al., "Rapid acquisition of specular and diffuse normal maps from polarized spherical gradient illumination", In Rendering Techniques, 2007, pp. 1-12.

Newell et al., "Stacked hourglass networks for human pose estimation", In European conference on computer vision, Jul. 26, 2016, pp. 483-499.

Piao et al., "Inverting generative adversarial renderer for face reconstruction", In Proceedings of the IEEE/CVF Conference on Computer Vision and Pattern Recognition, May 8, 2021, pp. 15619-15628.

Richardson et al., "3d face reconstruction by learning from synthetic data", In 2016 fourth international conference on 3D vision (3DV), Sep. 26, 2016, pp. 460-469. IEEE.

Richardson et al., "Learning detailed face reconstruction from a single image", In Proceedings of the IEEE conference on computer vision and pattern recognition, Apr. 6, 2017, pp. 1259-1268.

Pomdhani et al., "Estimating 3d shape and texture using pixel intensity, edges, specular highlights, texture constraints and a prior", In 2005 IEEE Computer Society Conference on Computer Vision and Pattern Recognition (CVPR'05), 2005, pp. 986-993, vol. 2.

Sanyal et al., "Learning to regress 3d face shape and expression from an image without 3d supervision" In Proceedings of the IEEE/CVF Conference on Computer Vision and Pattern Recognition, 2019, pp. 7763-7772.

Sela et al., "Unrestricted facial geometry reconstruction using image-to-image translation", In Proceedings of the IEEE International Conference on Computer Vision, 2017, pp. 1576-1585.

Sengupta et al., "Sfsnet: Learning shape, reflectance and illuminance of facesin the wild", In Proceedings of the IEEE conference on computer vision and pattern recognition, 2018, pp. 6296-6305.

Shang et al., "Self-supervised monocular 3d face reconstruction by occlusion-aware multi-view geometry consistency", In Computer Vision ECCV 2020: 16th European Conference, Glasgow, UK, Proceedings, Part XV 16, Aug. 23, 2020, pp. 53-70.

Tewari et al., "Self-supervised multi-level face model learning for monocular reconstruction at over 250 hz", In Proceedings of the IEEE Conference on Computer Vision and Pattern Recognition, Mar. 29, 2018, pp. 2549-2559.

Tewari et al., "Mofa: Model-based deep convolutional face autoencoder for unsupervised monocular reconstruction", In Proceedings of the IEEE International Conference on Computer Vision Workshops, Dec. 7, 2017, pp. 1274-1283.

Thies et al., "Face2face: Real-time face capture and reenactment of rgb videos", In Proceedings of the IEEE conference on computer vision and pattern recognition, Jul. 27, 2020, pp. 2387-2395.

Tran et al., "Towards high-fidelity nonlinear 3d face morphable model", In Proceedings of the IEEE/CVF Conference on Computer Vision and Pattern Recognition, pp. 1126-1135, 2019.

Tran et al., "Nonlinear 3d face morphable model", In Proceedings of the IEEE conference on computer vision and pattern recognition, Aug. 26, 2018, pp. 7346-7355.

Wang, Ruizhe, et al., "Digital twin: Acquiring high-fidelity 3d avatar from a single image", arXiv preprint arXiv:1912.03455, Dec. 7, 2019.

Wang, Ting-Chun, et al., "High-resolution image synthesis and semantic manipulation with conditional GANs", In Proceedings of the IEEE conference on computer vision and pattern recognition, Aug. 20, 2018, pp. 8798-8807.

Wu et al., "Unsupervised learning of probably symmetric deformable 3d objects from images in the wild", In Proceedings of the IEEE/CVF Conference on Computer Vision and Pattern Recognition, Mar. 31, 2020, pp. 1-10.

Yamaguchi et al., "High-fidelity facial reflectance and geometry inference from an unconstrained image", ACM Transactions on Graphics (TOG), Aug. 2018, pp. 1-14, vol. 37(4).

Yang et al., "Facescape: a large-scale high quality 3d face dataset and detailed riggable 3d face prediction", In Proceedings of the IEEE/CVF Conference on Computer Vision and Pattern Recognition, pp. 601-610, 2020.

* cited by examiner (a)

(b)    (c)

(a) UV Coordinates     (b) Position Map     (c) Face Region Map

Input multi-view images          Captured geometry          Rendering (a) Input　　　(b) MVS+Fitting　　　(c) ReFA (a) UV-space feature
w/ embedding networks (b) UV-space feature
w/o embedding network

SYSTEMS AND METHODS FOR FACE ASSET CREATION AND MODELS FROM ONE OR MORE IMAGES

CROSS REFERENCE TO RELATED APPLICATION(S)

This application claims benefit of U.S. Provisional Patent Application 63/376,701, filed Sep. 22, 2022, and U.S. Provisional Patent Application 63/376,704, filed Sep. 22, 2022, the entire contents of each of which are hereby incorporated by reference.

STATEMENT REGARDING FEDERALLY SPONSORED RESEARCH OR DEVELOPMENT

This invention was made with government support under Grant No(s). W911NF-14-D-0005 and W911NF-20-2-0053, awarded by the Army Research Laboratory (ARL) and Army Research Office (ARO). The government has certain rights in the invention.

BACKGROUND

Field

The present disclosure is generally related to systems and methods for reconstructing complete face models from a single image and from multi-view images.

Description of Related Art

Photo-realistic face avatar capture continues to be popular in entertainment media due to the realism and immersion it enables. As digital assets created from photos of human faces surpass their artist-created counterparts in both diversity and naturalness, there are increasing demands for digitized face avatars in the majority of the sectors in the digital industry: movies, video games, teleconference, and social media platforms, to name a few. In a studio setting, the term "avatar" encompasses several production standards for a scanned digital face, including high-resolution geometry (with pore-level details), high-resolution facial textures (4K) with skin reflectance measurements, as well as a digital format that is topologically consistent and ready to be rigged and animated. These standards together are oftentimes referred to as a production-ready face avatar.

Production-ready high-quality 3D avatars, as a common practice, may be typically affordable by professional studios involving sophisticated scanning equipment and intensive manual work by skillful artists. To simplify and automate this process, face modeling, from a single-view as well as multi-point images, has gained popularity. Growing demands for face acquisition in both research and digital production would greatly benefit from a much faster and fully automatic system that produces professional-grade face avatars.

In the past two decades, much effort has been made into face modeling and the realm of 3D monocular face reconstruction. However, very few monocular face reconstruction methods truly meet desired requirements. Deep learning-based methods have dominated in terms of robustness and efficiency, yet one difficulty of deep learning-based methods becomes how to collect enough training data with ground truth labels to feed the network. Although synthetic data generated from 3DMM or photo-realistic rendering of 3D scans may be used for supervised learning, there is still a domain gap when applying the trained model to real-world images. To solve this problem, current state-of-the-art parametric model-based methods may combine a regressor or a GAN structure with differentiable renderer to infer shape and albedo parameters from in-the-wild images for unsupervised learning. This type of reconstructed geometry accuracy tends to be limited due to the limited representation power of a parametric space and limited rendering quality by a simplified shading model, which brings a lot of domain shift noise to the training process. Non-parametric approaches usually use inverse rendering or optimization to try to enable better flexibility in modeling shape non-linear deformation and details. However, these methods are sensitive to initial, resulting in ambiguity and inconsistent topologies. From the system perspective, hardly any of the existing avatar creation pipelines produce a full set of assets for realistic rendering. While some may have been able to produce somewhat realistic outputs, the geometry of such pipelines are typically reconstructed by a 3DMM regressor, which cannot or do not meet the requirement of high surface accuracy.

Additionally, several efforts have been made to apply a wide range of techniques to improve accuracy and robustness of the face fitting with 3DMM. However, known iterative fitting-based approaches tend to still be unreliable, especially for unconstrained images with challenging poses, illumination, and expressions.

Deep neural networks greatly boost robustness by learning a regression from an input image to the 3DMM model space. Synthetic data rendered from random 3DMM samples may be used for supervised learning. However, a network trained purely on synthetic data performs poorly when fed with real-world face images. In some cases, methods have been employed to utilize landmarks and identity constraints instead of ground truth parameters as supervision to train a regressor with in-the-wild images. Later on, a differentiable renderer may be introduced with a 2D image projection loss to aim for unsupervised learning using in-the-wild images. However, reconstruction accuracy typically still remains limited due to, for example: 1) the representation power of linear 3DMM; 2) the render loss is measured in projected 2D image space without penalty for depth value, resulting in ambiguity face geometry; and 3) the differentiable renderer with a simplified shading model cannot produce realistic images, which brings domain gap to the training and testing.

In some instances, learned non-linear parametric space may be introduced to try and obtain better modeling capability of non-linear shape deformation. Encoder-decoder or GAN-based structures may be used to learn a parametric space instead of a linear 3DMM. To eliminate reconstruction ambiguity, some may have added multi-view constraints in the network. To reduce the domain gap of the rendered images and real images, more complicated shaders may be introduced to achieve realistic rendering effect. Due to the fixed parametric space, parametric-based methods have limited freedom to model local features and details.

Non-parametric methods may be optimized for face shape and/or texture from 2D images without a prior image. A deformation map may be optimized and added to a mean face for inferring shape and pose. Inverse rendering may be used to disentangle surface normal, albedo, and lighting. An Image-to-Image translation network that jointly maps the input image to depth image and a facial correspondence map for high-quality facial detail reconstruction has been utilized in some cases. In others, a direct approach to 3D facial reconstruction from a single 2D image using volumetric CNN regression has been tried, which performs robust to large poses and occlusions. Symmetry to recover a detailed 3D face has also been used. A normal-conditioning neural renderer (instead of a graphics-based differentiable renderer) has also been used to produce vivid face images, which aims to avoid rendering errors caused by a simplified differentiable renderer. Non-parametric-based approaches show more freedom of geometry modeling, especially for details. However, it usually produces shape in an arbitrary topology, which is unsuitable for tasks like avatar creation.

With regards to facial texture inference for photorealistic rendering, the resolution and quality of albedo generated by a 3DMM-based method typically do not meet the requirement of high-quality avatar creation. Some predict displacement maps which may capture middle-to-high geometries like wrinkles, folds; yet, in order to adapt the texture assets to a modern physically-based rendering pipeline, skin specularity is also desired. Complete diffuse albedo and specular maps may be predicted for PBR-based rendering. Still, such methods may lack consistency and accuracy.

Further, traditional asset creation pipelines typically require both long processing time and manual cleanup.

Other known professional approaches employ a two-step approach to the creation of the face assets. The first step computes a middle-frequency geometry of the face (with noticeable wrinkle and facial muscle movement) from multi-view stereo (MYS) algorithms. A second registration step is then taken to register the geometries to a template base topology, commonly of lower resolution with around 10k to 50k vertices. For production use, the registered base mesh is augmented by a set of texture maps, composed of albedo, specular and displacement maps, which are computed via photogrammetry cues and specially designed devices (e.g., polarizers and gradient light patterns). The lower-resolution base mesh is combined with a high resolution displacement maps to represent geometry with pore, freckle-level details. Modern physically-based rendering agents further utilize the albedo and specularity maps to render the captured face in photo-realistic quality. While the avatars acquired thereby achieve satisfactory realism, many difficulties in this setting inevitably pose high-quality face avatar capturing as a costly operation that is far from mass production and easy accessibility. More specifically, traditional MVS algorithms and registration take hours to run for a single frame of a scan. The registration process is also error-prone, oftentimes requiring manual adjustment to the initialization and cleanup by the professional artists. In addition, special devices (such as polarizers) are needed for capturing skin reflectance properties. The long production cycle, intensive labor work and equipment cost for special devices holds back a wider availability of high-quality facial capturing.

Additional neural-learning-based techniques have also been attempted for producing face avatars. Model-based approaches are known to incorporate a 3D morphable model as the prior to reconstruct face geometry from a sequence of image input. Despite possible increases in efficiency, prior art techniques have yet to succeed in matching quality and completeness of production-ready avatars, due to the limited expressiveness and flexibility of the parametric space of the morphable model. On the other hand, deep stereo matching approaches may achieve higher accuracy in 3D reconstruction by accurately regressing depth under geometric priors. Performing deep MVS framework may infer shapes within 0.88 mm median error, and the inference time is within a second. However, nontrivial steps are still required to obtain the registered meshes and the corresponding texture maps. TOFU has shown dedicated designs for neural face acquisition, and may have achieved increased accuracy in the face reconstruction and a solution that combines reconstruction with registration in an end-to-end manner. TOFU may learn the probability distributions of the individual vertices in a volumetric space, posting the reconstruction as a coarse-to-find landmark classification problem. However, the formulation limits TOFU to use a relatively low-resolution geometry representation (~8K), which is in addition incompatible with texture inference.

Other high-quality performance capture of human face is commonly done with passive or active MVS capture systems. The complete procedures to acquire 3D avatars from the captured data involve two major steps from multi-view stereopsis to registration, and each of them has been studied as an individual problem.

Multi-view stereopsis is commonly the first step for acquiring dense 3D geometry and the algorithms proposed in the past have emphasized various deigns for both joint view selection and normal/depth estimation. Neural-based MVS approaches proposed in recent years may have significantly increased the efficiency and generalized well to as few as a pair of stereo images.

The output of the multi-view stereopsis may be, in general, in the form of dense depth maps, point clouds, or 3D surfaces. Regardless of the specific representations, the geometries may be processed into 3D meshes, and a follow-up registration process may align all captured shapes to a predefined template topology. The registration process may be done either by explicitly regressing coefficients of a parametric face morphable model, directly optimizing shape with a non-rigid Iterative Closest Point registration algorithm or globally optimizing over a dataset of scanned face to find the groupwise correspondences.

Settings where geometries are reconstructed from a monocular image or a sparse set of views are in general ill-posed. Efforts in this direction are thus mainly data-driven, where a popular line of methods can be considered as fitting parametric models to the target image space. Deep neural networks may have been utilized in recent works for the regression of the parameters that drive a morphable model. Such designs may be more robust to challenging poses, illumination, and expressions from the unconstrained images. However, the quality and accuracy of monocular face reconstruction are not or may not be suitable for production use in professional settings. The inherent ambiguity of focal length, scale, and shape oftentimes lead a monocular reconstruction network to produce different shapes for the same face viewed at different angle.

Few prior methods have attempted a data-driven approach to MVS face reconstruction. When camera views are abundant, modern face capture pipelines may have demonstrated detailed and precise face reconstruction with pore-level appearance without the needs for a learned mapping in their computations. However, as introduced in the previous section, the manual costs and computation overhead of these pipelines may have at least inspired many to propose neural-based frameworks that automate and accelerate key steps in face capture applications, e.g., deep stereo matching and registration. TOFU offers a topologically consistent approach to fast acquisition of a full set of face assets, whose quality may outperform previous neural-based approaches on both monocular and multi-view face reconstruction. Consistency of the vertex correspondences is achieved by predicting the probabilistic distributions of each individual vertex in a coarse-to-fine manner. However, since the finest template used in TOFU contains 10,495 vertices, such a design results in an overly large problem space that is less efficient in inferring accurate geometries.

Controlled environments are usually needed to collect the ground-truth photorealistic appearance of a human face, exemplified by a Light Stage. Neural-based reconstruction network trained on the captured appearance information generally employs an encoder-decoder structure to simultaneously infer skin reflectance and illumination alongside the geometry, where the quality of the inferred textures were limited due to either reliance on synthetic data or oversimplified reflectance model. Some methods may have both utilized generative adversarial training and an image translation network to performance texture inference that are photo-realistic and render-ready, where high-quality albedo, displacement and specular maps were decoupled from the input face images.

SUMMARY

It is an aspect of this disclosure to provide a method for constructing a 3D face model. The method includes: providing a reference as a template, the reference containing a 3D mesh that represents an item and a UV texture mapping that maps each point on the 3D mesh to a 2D UV space, the item being a median face, vertex positions or surface points; receiving one or more input images in an image space of a face; extracting geometry feature and texture feature in the image space; extracting features in a UV space; iteratively computing or producing a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state; and outputting a pose in a canonical space of the 3D mesh and UV-space map for the one or more input images, wherein each pixel in the UV-space map stores a coordinate of a corresponding point in the canonical space of the 3D mesh.

Another aspect provides a non-transitory machine-readable medium storing instructions which, when executed by at least one programmable processor, cause the at least one programmable processor to perform operations including: providing a reference as a template, the reference containing a 3D mesh that represents an item and a UV texture mapping that maps each point on the 3D mesh to a 2D UV space, the item being a median face, vertex positions or surface points; receiving one or more input images in an image space of a face; extracting geometry feature and texture feature in the image space; extracting features in a UV space; iteratively computing or producing a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state; and outputting a pose in a canonical space of the 3D mesh and UV-space map for the one or more input images, wherein each pixel in the UV-space map stores a coordinate of a corresponding point in the canonical space of the 3D mesh.

Yet another aspect provides a system that has at least one programmable processor and a non-transitory machine-readable medium storing instructions which, when executed by the at least one programmable processor, cause the at least one programmable processor to perform operations including: providing a reference as a template, the reference containing a 3D mesh that represents an item and a UV texture mapping that maps each point on the 3D mesh to a 2D UV space, the item being a median face, vertex positions or surface points; receiving one or more input images in an image space of a face; extracting geometry feature and texture feature in the image space; extracting features in a UV space; iteratively computing or producing a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state; and outputting a pose in a canonical space of the 3D mesh and UV-space map for the one or more input images, wherein each pixel in the UV-space map stores a coordinate of a corresponding point in the canonical space of the 3D mesh.

Still yet another aspect of this disclosure provides a system for obtaining images of a subject. The system may include: a modular frame assembly for enclosing a 180 degree area, the modular frame assembly having at least two vertical support members and at least two horizontal support members. A first horizontal support member may be provided at a first horizontal position and at least a second horizontal support member may be provided at a second horizontal position. The system also includes a plurality of cameras provided on the modular frame assembly, said plurality of cameras being configured to receive power from a power source; at least one interval timer connected to said plurality of cameras; and a lighting system having a plurality of light boxes, each light box spaced relative to the modular frame assembly about the 180 degree area for lighting the subject from multiple directions. Moreover, at least one programmable processor is connected to said plurality of cameras. Upon activation of the at least one interval timer, the plurality of cameras are directed to obtain one or more images of the subject and communicate with the at least one programmable processor.

According to embodiments, the at least one programmable processor is configured to: provide a reference as a template, the reference containing a 3D mesh that represents an item and a UV texture mapping that maps each point on the 3D mesh to a 2D UV space, the item comprising a median face, vertex positions or surface points; receive one or more input images in an image space of a face; extract geometry feature and texture feature in the image space; extract features in a UV space; iteratively compute or produce a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state; and output a pose in a canonical space of the 3D mesh and UV-space map for the one or more input images, wherein each pixel in the UV-space map stores a coordinate of a corresponding point in the canonical space of the 3D mesh. That is, in embodiments, the at least one processor is configured to perform the disclosed DIFF method or technique. In embodiments, the at least one processor is configured to perform the disclosed ReFA method or technique.

Other aspects, features, and advantages of the present disclosure will become apparent from the following detailed description, the accompanying drawings, and the appended claims.

DETAILED DESCRIPTION OF THE PREFERRED EMBODIMENT(S)

Figure 1:
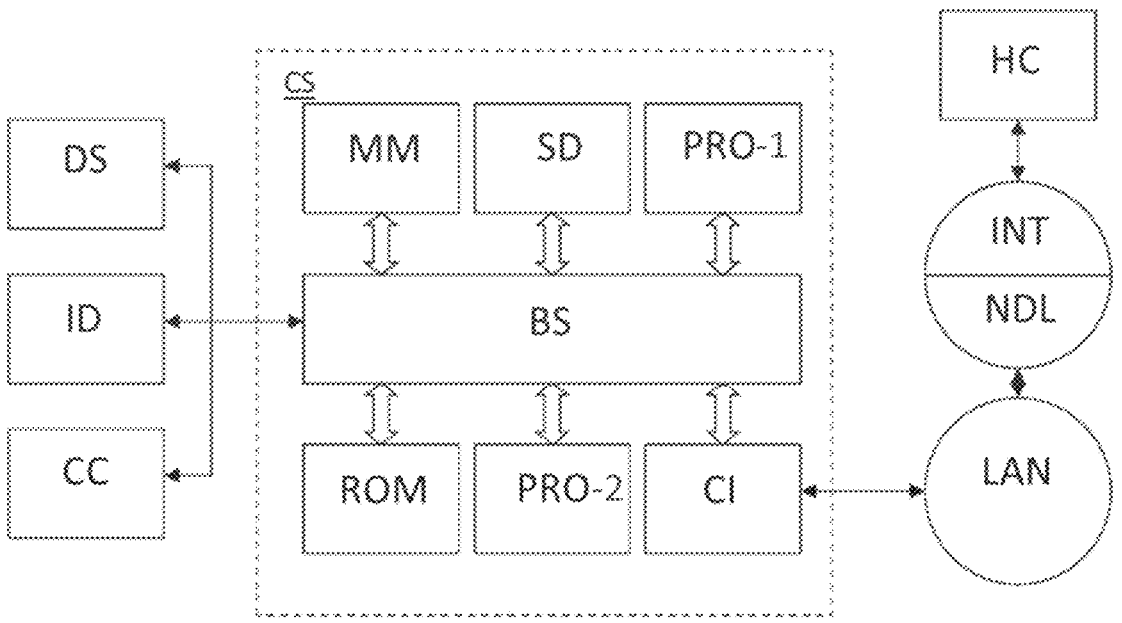
FIG. 1 illustrates a block diagram of an example computer system CS used to perform the disclosed methods and features according to embodiments herein.

Embodiments of this disclosure will now be described in detail with reference to the drawings and pictures, which are provided as illustrative examples so as to enable those skilled in the art to practice the invention. Notably, the figures and examples below are not meant to limit the scope of this disclosure to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure this disclosure. In the specification, an embodiment showing a singular component should not be considered limiting; rather, this disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, this disclosure encompasses present and future known equivalents to the components referred to herein by way of illustration. Other and further aspects and features will be evident from reading the following detailed description of the embodiments, which are intended to illustrate, not limit, this disclosure.

As used herein, the singular form of "a", "an", and "the" include plural references unless the context clearly dictates otherwise. As used herein, the term "or" means "and/or" unless the context clearly dictates otherwise.

Any directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As described herein, to simplify and automate the processes for producing high quality 3D avatars and creating production-ready face assets, a number of face modeling techniques produced from a single-view as well as multi-view images are disclosed herein. For example, face modeling significantly boosts the development of many applications, including AR/VR, teleconference, animation in gaming, and social media apps that require a personalized avatar. This disclosure utilizes both parametric-based and non-parametric approaches.

The disclosed embodiments are robust to large expressions and poses, and generate accurate geometry and skin reflectance maps. For example, in embodiments, the network/system extracts feature(s) in both the image space and the UV space and iteratively optimizes face geometries by projecting the image-space features to UV space and comparing them with a reference UV space feature (e.g., using, e.g., a symmetric-aware neural optimizer).

In embodiments, a UV positional template for pixel-level geometry deformation flexibility and a semantic feature matching optimization component to retain the consistent reconstruction topology is employed.

In accordance with the present disclosure, a method for achieving realistic face modeling should at least: faithfully capture the face geometry and appearance; be robust to input images with extreme expressions and camera poses; and produce complete face assets for industrial rendering, animation pipeline for realistic rendering. As evident by the drawings and below description, according to embodiments herein, this disclosure achieves such goals and more.

According to embodiments herein, this disclosure presents a Deep Iterative Face Fitting (DIFF), an end-to-end neural network for face asset creation. For example, in embodiments, from a single image, a method is disclosed that is designed to reconstruct a complete face model, including pore-level face geometries along with detailed albedo and specular maps in 4K resolution, which may readily be used in industrial pipelines for physically-based rendering. Compared to other face-related tasks, the creation of face assets for professional usage demands reconstructing more accurate geometries and more detailed textures. To achieve this, in embodiments, the disclosed network extracts features in both the image space and the UV space and iteratively optimizes the face geometries by projecting the image-space features to the UV space and comparing them with a reference UV space feature using a symmetry-aware neural optimizer. Such end-to-end design makes the algorithm robust to extreme poses, expressions, and illumination. Further, a Face Asset Dataset (FAD) collected on a Light Stage may be utilized according to embodiments herein. In embodiments, the dataset may contain 75 subjects, each with 26 expressions, to provide ground truth geometries with sub-millimeter accuracy and 4K texture maps for both training and evaluation, for example. As a result, according to some embodiments, the disclosed approach outperforms previous single-image face reconstruction methods and, in some cases, with a median geometry error of 0.8 mm.

In this disclosure, a common face acquisition setting where a collection of calibrated cameras captures the color images that are processed into a full set of assets for a face avatar is also considered.

In light of the progress needed as addressed in the background section, another goal herein is a comprehensive, animation-ready neural face capturing solution that can produce production-grade dense geometry (combining a midfrequency mesh with high-resolution displacement maps), complete texture maps (high-resolution albedo and specular maps) required by most PBR skin shaders, and consistent topology across subjects and expressions. Moreover, the disclosed model aims for high efficiency, creating comprehensive face assets within a second, fully automatic, an end-to-end system without the need for manual editing and post-processing, and device-agnostic, easily adaptable to any multi-view capturing rigs with minimal finetuning, including light-weight systems with sparse camera views.

According to embodiments herein, this disclosure presents Recurrent Feature Alignment (ReFA), another end-to-end neural-based system designed to faithfully capture both the geometry and the skin assets of a human face from multiview image input and fully automatically create a face avatar that is production-ready. For example, in embodiments, from multi-view images, the disclosed ReFA method reconstructs an accurate, complete, registered, and textured face model, including pore-level face geometries along with high-resolution skin reflectance maps (albedo and specular maps), which can readily be used in the industrial pipelines for physically-based rendering. In embodiments, the disclosed method and network is based on a position map in the UV space. The disclosed network may extract per-pixel features in both the multi-view image space and the UV space and a recurrent module then iteratively optimizes the geometry by projecting the image-space features to the UV space and comparing them with a reference UV-space feature. The optimized geometry may then provide pixel-aligned signals for the inference of high-resolution textures in such embodiments. Compared to traditional asset creation pipelines that require both long processing time and manual cleanup, ReFA is fully automatic and significantly more efficient with minimum compromise on the quality and completeness of the created assets, which is unseen amongst neural-based techniques. Experiments have validated that the disclosed ReFA may achieve a median error of 0.608 mm in geometry reconstruction, is robust to extreme pose and expression, and excels in sparse-view settings. Accordingly, in embodiments, the disclosed network enables lightweight, fast face assets acquisition that significantly boosts the downstream applications, such as avatar creation and facial performance capture. The disclosed embodiments may also enable massive database capturing for deep learning purposes.

As detailed below, ReFA may be based on two key designs to realize the aforementioned goals. The first is the use of a UV-space position map for representing geometry, where each pixel is mapped to the position of a surface vertex. Such representation is not only amenable to effective processing with image convolution networks, but it offers an efficient way to encode dense, registered shape information (a 128×128 size of position map encodes up to 16K vertices) across subjects and expressions, and organically aligns the geometry and texture space for the inference of high-frequency displacement maps and high-resolution textures. The position map also provides pixel-level flexibility for geometry optimization, which allows modeling of extreme expression, non-linear muscle movement and other challenging cases. In this disclosure, a position map of 512×512 size is adopted, with a capacity of around 260K vertices that are well capable of modeling middle-frequency details directly using a neural network. The second design is a learned recurrent face geometry optimizer that effectively aligns UV-space semantic feature with the multi-view visual features for topologically consistent geometry reconstruction. The recurrent optimization is centered around a per-pixel visual semantic correlation (VSC) that serves to iteratively refine the face geometry and a canonical head pose. The refined geometry then provides pixel-aligned signals to a texture inference network that accurately infers albedo, specular and displacement map in the same UV space.

Experiments as described below have validated that the disclosed system ReFA meets at least its goal in fast and accurate multi-view face reconstruction, outperforming the previous state-of-the-art methods in both visual and numerical measurements. The disclosed system and methods further show in an ablation study that the disclosed design choices are effective and the disclosed model is robust to sparse view input. As ReFA utilizes a flexible shape representation and produces a full set of face assets that is ready for production-level animation, this disclosure further demonstrates applications in avatar creation, 4D capture and adaptation of the disclosed model to the productions of other digital formats.

In accordance with the present disclosure, the methods for achieving realistic face modeling further provides ReFA as a neural-based comprehensive face capturing system that faithfully reconstructs both the geometry and the skin assets of a human face from multi-view images input and fully automatically create a 3D face avatar that is production-ready. The disclosed model outperforms previous neural-based approaches in both accuracy and speed (e.g., with a median error of 0.6 mm and a speed at 4.5 FPS). An improved formulation of the geometry representation with the UV-space positional map and a recurrent geometry optimizer that provides an effective solution to high-quality face asset creation is also provided. Further, the disclosed system has great application values in many downstream tasks, including, but not limited to, rapid avatar creation and 4D performance capture. The improvement in speed and accuracy brought by the disclosed system may greatly facilitate the accessibility of face capturing to support an emerging industrial field.

These and other improvements to face asset modeling are disclosed and discussed herein and below with regards to the embodiments.

The methods, steps, processes, and/or operations discussed in the embodiments herein may be implemented by one or more computer systems CS, as shown in FIG. 1. FIG. 1 shows an exemplary computer system CS, according to embodiments herein, that includes a bus BS or other communication mechanism for communicating information and at least one processor PRO (or multiple processors PRO-1 and PRO-2) coupled with bus BS for processing information. PRO-1 and PRO-2 may be individual or separate processors, or combined into a single processor PRO, according to embodiments herein. Herein, for explanatory purposes only, processor PRO may be utilized to generally note use of either PRO-1 or PRO-2, or both.

In embodiments, the at least one processor may be a device for providing a reference as a template, receiving image(s), extracting feature(s), computing or producing a feature map, and/or outputting a pose or 3D template map, as described herein.

In some cases, Computer system CS also includes a main memory MM, such as a random access memory (RAM) or other dynamic storage device, coupled to bus BS for storing information and instructions to be executed by processor PRO-1 (or PRO). Main memory MM also may be used for storing temporary variables or other intermediate information during execution of instructions to be executed by processor PRO-1. Computer system CS further includes a read only memory (ROM) ROM or other static storage device coupled to bus BS for storing static information and instructions for processor PRO-2 (or PRO). A storage device SD, such as a magnetic disk or optical disk, is provided and coupled to bus BS for storing information and instructions.

Computer system CS may be coupled via bus BS to a display DS, such as a cathode ray tube (CRT) or flat panel or touch panel display for displaying information to a computer user. In embodiments, display DS may be an output device for outputting a pose or updated 3D template map, as described herein. An input device ID, including alphanumeric and other keys, is coupled to bus BS for communicating information and command selections to processor PRO. Another type of user input device is cursor control CC, such as a mouse, a trackball, or cursor direction keys for communicating direction information and command selections to processor PRO and for controlling cursor movement on display DS. This input device typically has two degrees of freedom in two axes, a first axis (e.g., x) and a second axis (e.g., y), that allows the device to specify positions in a plane. A touch panel (screen) display may also be used as an input device.

In embodiments, devices (such as cameras, interval timers) may be connected to the processor. In embodiments, such devices may be connected to a hub (not shown in FIG. 1) which connects to the at least one processor; the hub may be designed to send and/or receive information to connected devices and the at least one processor, according to embodiments.

According to one embodiment, portions of one or more methods (DIFF, ReFA) described herein may be performed by computer system CS in response to processor PRO executing one or more sequences of one or more instructions contained in main memory MM. Such instructions may be read into main memory MM from another computer-readable medium, such as storage device SD. Execution of the sequences of instructions contained in main memory MM causes processor PRO to perform the process steps described herein. One or more processors in a multi-processing arrangement may also be employed to execute the sequences of instructions contained in main memory MM. In an alternative embodiment, hard-wired circuitry may be used in place of or in combination with software instructions. Thus, the description herein is not limited to any specific combination of hardware circuitry and software.

The terms "machine-readable medium" or "computer-readable medium" as used herein refers to any medium that participates in providing instructions to processor PRO for execution. Such a medium may take many forms, including, but not limited to, non-volatile media, volatile media, and transmission media. Non-volatile media include, for example, optical or magnetic disks, such as storage device SD. Volatile media include dynamic memory, such as main memory MM. Transmission media include coaxial cables, copper wire and fiber optics, including the wires that comprise bus BS. Transmission media can also take the form of acoustic or light waves, such as those generated during radio frequency (RF) and infrared (IR) data communications. Computer-readable media can be non-transitory, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge. Non-transitory computer readable media can have instructions recorded thereon. The instructions, when executed by a computer, can implement any of the features described herein. Transitory computer-readable media can include a carrier wave or other propagating electromagnetic signal.

In embodiments, storage device SD may provide a reference as a template, as described herein. In embodiments, storage device SD may be an output device for outputting a pose or updated 3D template map, as described herein.

Various forms of computer readable media may be involved in carrying one or more sequences of one or more instructions to processor PRO for execution. For example, the instructions may initially be borne on a magnetic disk of a remote computer. The remote computer can load the instructions into its dynamic memory and send the instructions over a telephone line using a modem. A modem local to computer system CS can receive the data on the telephone line and use an infrared transmitter to convert the data to an infrared signal. An infrared detector coupled to bus BS can receive the data carried in the infrared signal and place the data on bus BS. Bus BS carries the data to main memory MM, from which processor PRO retrieves and executes the instructions. The instructions received by main memory MM may optionally be stored on storage device SD either before or after execution by processor PRO.

Computer system CS may also include a communication interface CI coupled to bus BS. Communication interface CI provides a two-way data communication coupling to a network link NDL that is connected to a local network LAN. For example, communication interface CI may be an integrated services digital network (ISDN) card or a modem to provide a data communication connection to a corresponding type of telephone line. As another example, communication interface CI may be a local area network (LAN) card to provide a data communication connection to a compatible LAN. Wireless links may also be implemented. In any such implementation, communication interface CI sends and receives electrical, electromagnetic, or optical signals that carry digital data streams representing various types of information.

Network link NDL typically provides data communication through one or more networks to other data devices. For example, network link NDL may provide a connection through local network LAN to a host computer HC. This can include data communication services provided through the worldwide packet data communication network, now commonly referred to as the "Internet" INT. Local network LAN (Internet) both use electrical, electromagnetic, or optical signals that carry digital data streams. The signals through the various networks and the signals on network data link NDL and through communication interface CI, which carry the digital data to and from computer system CS, are exemplary forms of carrier waves transporting the information.

Computer system CS can send messages and receive data, including program code, through the network(s), network data link NDL, and communication interface CI. In the Internet example, host computer HC might transmit a requested code for an application program through Internet INT, network data link NDL, local network LAN and communication interface CI. One such downloaded application may provide all or part of a method described herein, for example. The received code may be executed by processor PRO as it is received, and/or stored in storage device SD, or other non-volatile storage for later execution. In this manner, computer system CS may obtain application code in the form of a carrier wave.

Turning now to the methods for constructing a 3D face model using said computer system CS, in a general sense, this disclosure is designed to provide a reference as a template and, using a single image or multi-view input images as input, extract a number of features in different spaces and iteratively compute or produce a feature map(s) for input to an RNN-based neural optimizer composed of Gated Recurrent Units (GRU) to determine a hidden state. As will be understood, a pose (e.g., head post) and/or updated 3D template map(s) may be output for the input image(s), as detailed in the embodiments below.

Deep Iterative Face Fitting (DIFF)

Figure 2:
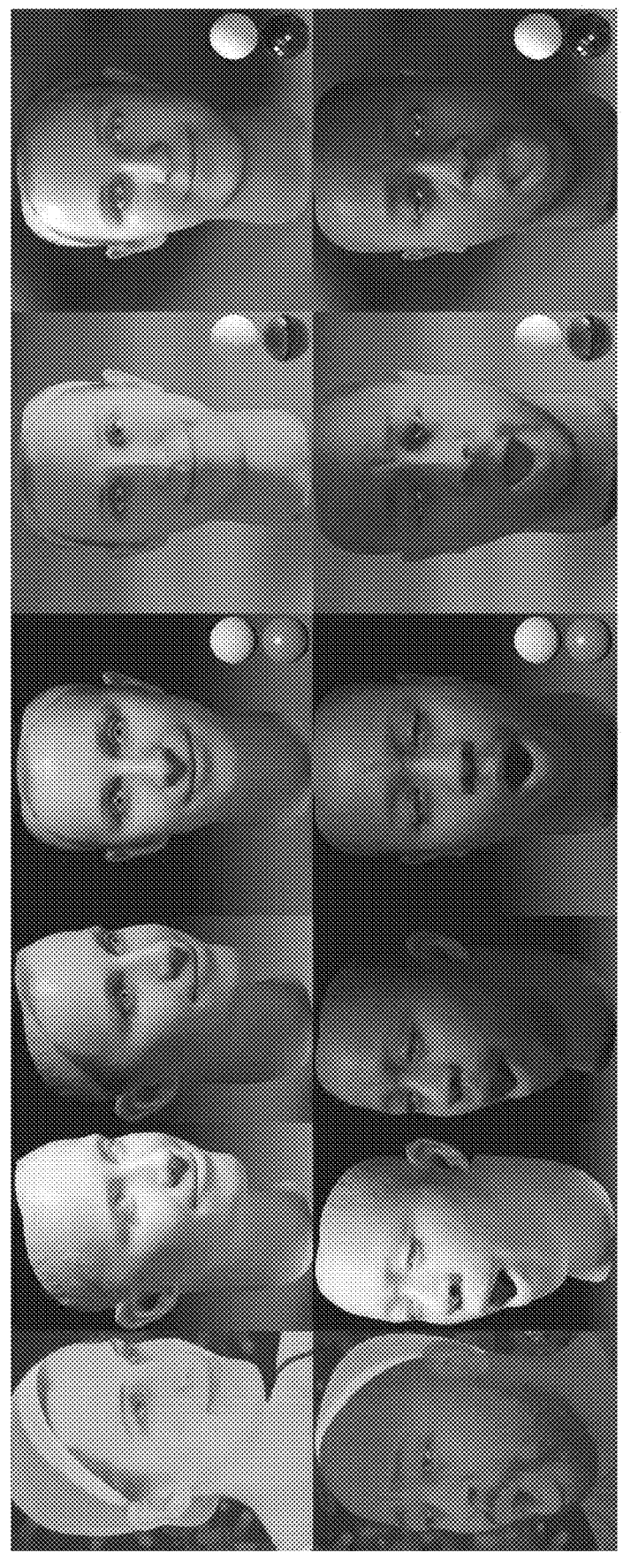
FIG. 2 shows exemplary rows with steps of a method (in columns) for producing production-ready face assets from a single image according to embodiments herein.

FIGS. 2-9 refer to one, non-limiting embodiment relating to an end-to-end neural network for production-ready face assets creation from a single image. Such steps and/or processes may be implemented by the one or more computer systems CS of FIG. 1, for example, according to embodiments herein. FIG. 2 shows rows depicting, in columns from left to right, an exemplary input image, reconstructed geometry, a rendered image with the full set of reconstructed assets in the predicted camera pose, a frontal view, and images rendered with the assets under different illuminations, according to embodiments herein. For example, to achieve the goals mentioned previously, the present disclosure introduces systems and methods for obtaining a face asset dataset (FAD). In accordance with some embodiments, the dataset of this disclosure may be captured by a Light Stage scan system, which achieves pore-level accuracy in both geometry and reflectance maps by combining photometric stereo reconstruction and polarization promotion. In embodiments, the present disclosure introduces systems and methods for obtaining a face asset dataset (FAD), a human face dataset acquired by Light Stage, including around 30,000 4K×4K multiview images and carefully processed geometry in sub-millimeter accuracy and consistency, skin reflectance (albedo and specularity) corresponded to each image.

The FAD provides supervision and evaluation for high-accuracy monocular face reconstruction by providing the 3D ground-truth geometry and correspondences. Based on this dataset, the present disclosure introduces systems and methods of deep iterative face fitting (DIFF), a non-parametric approach based on feature correlation and neural optimizers. Given a single image, DIFF infers highly accurate geometry and textures to generate a full set of production-ready assets. The disclosed network adopts a UV position map as the optimization domain, enabling pixel-level freedom to model non-linear deformations details. According to embodiments, DIFF extracts semantic features from the UV space and input image space separately. Starting from an initial state, DIFF further updates the UV position map and the camera pose iteratively using an RNN-based neural optimizer from the feature correlation between the UV space and the image space. The correlation feature is provided by a visual-semantic correlation network, which provides accurate pixel-aligned signals.

With DIFF, this disclosure demonstrates that using the face asset dataset disclosed herein, a fully end-to-end non-parametric model that infers highly accurate geometry and albedo from a single image may be (is) learned. The disclosed approach outperforms state-of-the-art monocular reconstruction methods in geometry accuracy. This disclosure showcases the quality of assets rendered directly in the physically-based shader. This disclosure also demonstrates that, even only trained with limited subjects, the disclosed model may generalize well to in-the-wild images with data augmentation. Contributions of these disclosed embodiments include, but are not limited to: presenting the Face Asset Dataset (FAD) that has sub-millimeter accuracy of topologically consistent geometry and precise skin reflectance properties; an end-to-end single image face asset creation framework DIFF that infers a complete set of production-ready assets, including accurate geometries, albedo, specular, and displacement maps; and a benchmark including metrics, data, and method to measure the single-view face reconstruction error of existing methods.

In a non-limiting and exemplary embodiment, the camera setup for the Light Stage system may include 25 Ximea machine vision cameras, including 17 monochrome and eight color cameras. The monochrome cameras, compared to their color counterparts, support more efficient and higher resolution capturing, allowing for sub-millimeter geometry details, albedo, and specular reflectance reconstruction. The additional color cameras may aid in stereo base mesh reconstruction. The RGB color may be obtained by adding successive monochrome images recorded under different illumination colors. A FACS set may be devised as part of this disclosure, in accordance with some embodiments, which combines 40 action units to a condensed set of 26 expressions for each of the subjects to perform. A total number of 75 subjects, ranging from age 18 to 67, were scanned as part of an exemplary embodiment. To increase diversity, in accordance with some embodiments, the dataset may be combined with a selection of 99 Triplegangers subjects, each with 20 expressions.

Data Processing according to embodiments is now described. Starting from the multi-view imagery, in accordance with some embodiments, the base mesh of the neutral expression scan may be first reconstructed using a multi-view stereo (MVS) algorithm. Then an ICT 3D morphable model may be used to fit the mesh and non-rigid Laplacian deformation to minimize the surface-to-surface distance further. For expressions, a set of generic blendshapes may be first adopted to fit the scan and followed by non-rigid mesh registration, according to some embodiments. Additionally, in some embodiments, image space optical flow from neutral to expression scan may be added as dense consistency constraint in the expression non-rigid Laplacian deformation to retain texture space and surface correspondence. In accordance with some embodiments, all the processed geometries and textures share the same topology with dense vertices correspondence. Diffuse-specular separation may be achieved using a given spherical illumination in accordance with embodiments. In accordance with some embodiments, pore-level details of the geometry may be computed by employing albedo and normal maps in stereo reconstruction and further represented as displacement maps and base mesh. The full set of the generic model includes a base geometry and texture maps (albedo, specular intensity, and displacement) encoded in 4K resolution, in accordance with some embodiments. 3D vertex positions may be rasterized to a three-channel bitmap of 256×256 pixels resolution to enable joint learning of the correlation between geometry and albedo.

Figure 3:
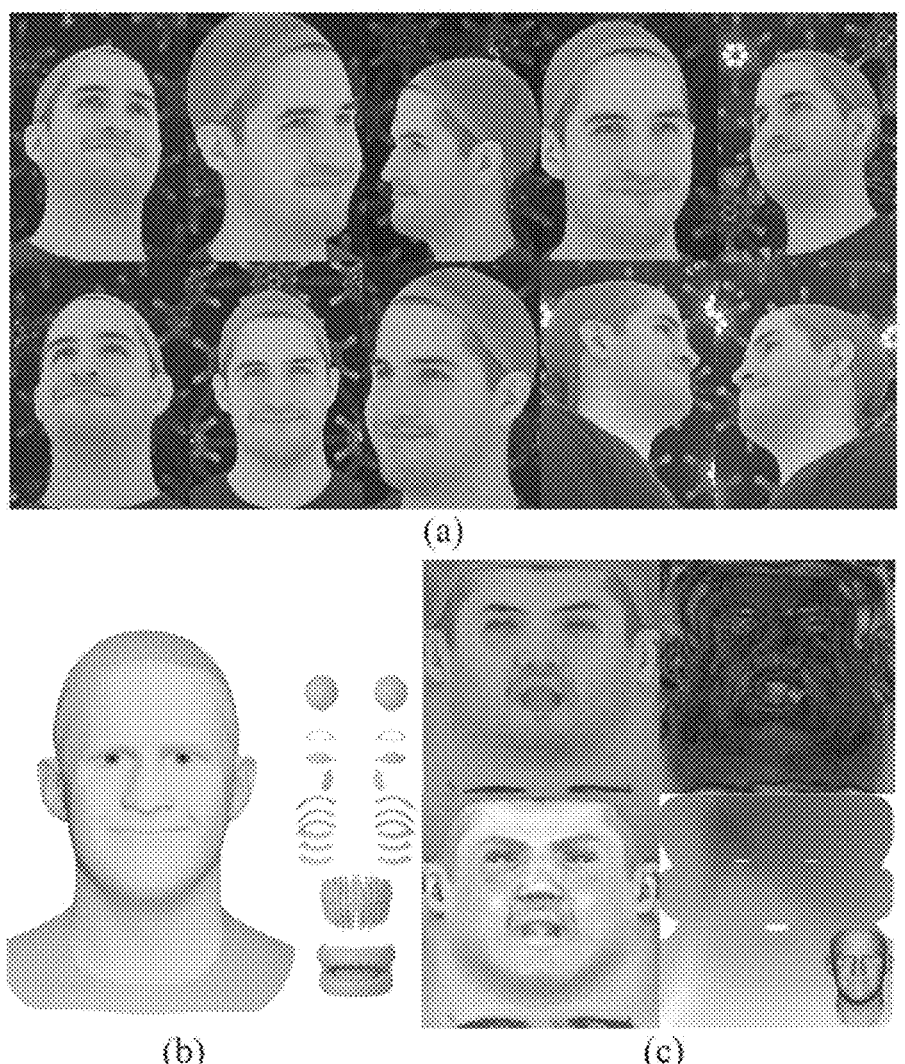
FIG. 3 shows an example of captured multi-view images and a full set of the processed face asset (labeled as (a), (b) and (c)) used for training, in accordance with embodiments herein.

FIG. 3 shows an example of captured multi-view images and a full set of the processed face assets (labeled as (a), (b) and (c)) used for training, in accordance with embodiments herein. In FIG. 3, (a) represents an exemplary set of selected views of captured images, (b) represents a model of a face, head, and neck, as well as teeth, gums, eyeballs, eye blending, lacrimal fluid, eye occlusion, and eyelashes used in the disclosure, and (c) represents a produced 4K×4K map of physically-based skin material: i.e., albedo (bottom-left), specular (top-left), and displacement maps (top-right). The geometry is represented in UV space. In some instances, parts may be directly adopted from a template, whereas other features are provided based on this disclosure.

Figure 4:
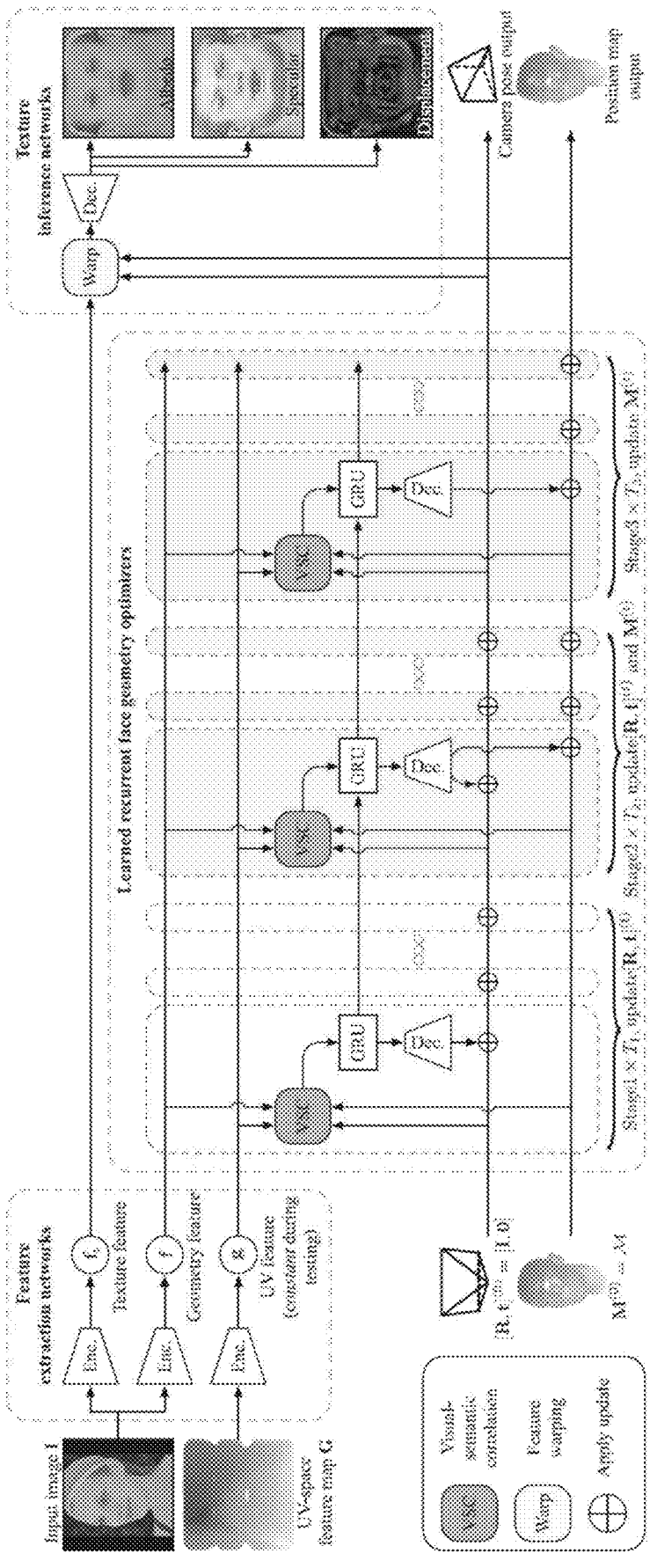
FIG. 4 illustrates an overview of an exemplary pipeline for a given input image when processed by the disclosed method and system, according to embodiments herein.

FIG. 4 illustrates an overview of an exemplary pipeline for a given input image when processed by the disclosed DIFF method and system, according to embodiments herein. In accordance with some embodiments, the pipeline may be divided into three parts: (1) a feature extraction network; (2) a recurrent face geometry network; and (3) a texture inference network. As will be described in greater detail, for DIFF, given an input image, the feature extraction networks may first extract features in image space and UV space. The disclosed learned recurrent face geometry optimizer then iteratively computes the visual semantic correlation and regress the geometry updates. Finally, the texture feature is projected back to the UV space to predict the texture maps.

More specifically, in embodiments, a reference face model is used as a template for face assets in accordance with embodiments of this disclosure. In accordance with some embodiments, the reference face model contains a 3D mesh $\mathcal{M}$ that represents a median face and a UV texture mapping $\phi$ that maps each points on $\mathcal{M}$ to a 2D UV space. From a single image $I \in \mathbb{R}^{H \times W \times 3}$, the disclosed method estimates a 6-DoF rigid transformation $[R, t] \in \mathbb{R}^{3 \times 4}$ that represents the camera pose in the canonical space of the template mesh $\mathcal{M}$ and a UV-space position map $M \in \mathbb{R}^{H_I \times W_I \times 3}$. In this disclosure, the position map M is a representation of the face geometry. Each pixel in M stores the $\mathbb{R}^3$ coordinate of its corresponding point in the canonical space of $\mathcal{M}$. In accordance with some embodiments, the disclosed systems and methods also produces an albedo map $A \in \mathbb{R}^{H_I \times W_I \times 3}$ a specular map $S \in \mathbb{R}^{H_I \times W_I \times 1}$, and a displacement map $D \in \mathbb{R}^{H_I \times W_I \times 1}$ to capture more textures and high-frequency details of the face.

This disclosure follows the pinhold camera model, in accordance with embodiments. For each point $X = [X, Y, Z]^T \in \mathbb{R}^3$ on the surface of the face geometry in the world space, its projection on the image plane is:

$$z[x, y, 1]^T = K \cdot [R, t] \cdot [X, Y, Z, 1]^T, \tag{1}$$

where $x = [x, y]^T \in \mathbb{R}^2$ is the projected 2D coordinates, $K \in \mathbb{R}^{3 \times 3}$ is the camera intrinsic. For convenience, this relationship may be re-written as $$x = \Pi_K(X, [R, t]) \tag{2}$$

where the projection function $\Pi$ satisfies Equation (1).

1) Feature Extraction Network

Visual Features

From the input image I, a ResNet-like backbone network may be used, in accordance with embodiments, to extract 2D features at ⅛ of the image resolution. The output may be split into two branches: the geometry feature $f \in$ $$\mathbb{R}^{\frac{W}{8} \times \frac{H}{8} \times C}$$

and the texture feature $f_t \in$ $$\mathbb{R}^{\frac{W}{8} \times \frac{H}{8} \times C_t}.$$

In accordance with some embodiments herein, the geometry feature map is used for fitting the 6-DoF rigid transformation $[R, t]$ and the position map M (Section 4.3), and the texture feature map $f_t$ is used for generating albedo maps A, specular maps S, and displacement maps D (Section 4.4).

UV Features

According to some embodiments, from the template mesh and its UV mapping, the UV-space feature map $G \in \mathbb{R}^{W_I \times H_I \times 36}$ may be assembled by concatenating the following features for each pixel u: (1) the 2D coordinate of u itself, normalized to $[-1,1]^2$; (2) the corresponding 3D coordinate of the pixel u in the template face mesh, normalized to $[-1,1]^3$ (3) the one-hot encoding of its face region, where a semantic face region map including 31 regions may be manually created; the feature G is processed through a convolutional neural network and get the resulting UV feature map G∈

$$\mathbb{R}^{\frac{W_t}{8} \times \frac{H_t}{8} \times C},$$

according to embodiments herein. Since G is a constant, the UV feature map g can also be understood as a trainable parameter, which is regularized by the CNN architecture and how G is constructed. Once trained, g may be set as a fixed constant.

2) Recurrent Face Geometry Network

The learned recurrent face geometry optimizer may be a module utilized to implement the disclosed methods and systems according to embodiment herein. Given a single image, this network iteratively optimizes the face geometry and outputs the pose $[R, t]^{(t)}$ and the position map $M^{(t)}$, where t is the index of the iteration. One of the central modules of the disclosed recurrent face geometry optimizer is a recurrent neural network (RNN) composed of Gated Recurrent Units (GRU). At the t-th step, in accordance with some embodiments herein, the network update may be written as:

$$y^{(t)} \leftarrow VSC(f, g, R^{(t-1)}, t^{(t-1)}, M^{(t-1)}), \tag{3}$$

$$h^{(t)} \leftarrow GRU(y^{(t)}, h^{(t-1)}), \tag{4}$$

$$\Delta^{(t)} \leftarrow Decoder(h^{(t)}), \tag{5}$$

In Equation (3), the feature map $y^{(t)} \in$ $$\mathbb{R}^{\frac{W_t}{8} \times \frac{H_t}{8} \times C_{VSC}}$$

is computed using the disclosed Visual Semantic Correlation (VSC) network, in accordance with embodiments, which will be introduced in Section 4.3.1. Next, $y^{(t)}$ is fed as the input feature map to a GRU-based RNN [7] and the hidden state $h^{(t)}$ is updated from the previous $h^{(t-1)}$ in Equation (4). After that, the geometry decoding network (Section 4.3.2) is used to process the hidden vector $h^{(t)}$ and compute the geometry update tuple $\Delta^{(t)}$. The geometry update tuple consists of three elements:

$$\Delta^{(t)} = (\delta q^{(t)}, \delta t^{(t)}, \delta M^{(t)}), \tag{6}$$

where $\delta q^{(t)} \in \mathbb{R}^4$ R4 is the predicted quaternion for correcting the camera rotation $R^{(t)}$, $\delta t \in \mathbb{R}^3$ is the predicted vector for correcting the camera translation $t^{(t)}$, and $\delta M^{(t)}$ is the predicted offset for correcting the position map M. Finally, the update $\Delta^{(t)}$ can be applied with $$R^{(t)} \leftarrow R^{(t-1)} \mathcal{R}(\delta q^{(t)})$$
$$t^{(t)} \leftarrow t^{(t-1)} + \delta t^{(t)} \tag{7}$$
$$M^{(t)} \leftarrow M^{(t-1)} + \delta M^{(t)}$$

Here, $\mathcal{R}(\cdot)$ maps a quaternion into the corresponding rotation matrix. For initialization, the camera pose is set as $[R, t]^0 = [I, O]$ and the position map is set as $M^0 = \mathbb{R}$.

Multi-Stage Optimization

Decomposing the face geometry into $[R, t]$ and M is intrinsically ambiguous. For example, for any geometry $([R, t], M)$, such may also be represented with $([I, O], M')$, where $M'(u) = R(M(u)) + t$. Such ambiguity could cause stability issues if $[R, t]$ and M are optimized simultaneously during inference. To increase the stability of the optimization, in some embodiments, a 3-stage optimization strategy is used:

1. In the first stage, the position map $M^{(t)}$ may be fixed to be the mean face geometry $\mathcal{M}$ and only update $[R, t]^{(t)}$ for $T_1$ iterations;
2. In the second stage, both $[R, t]^{(t)}$ and $M^{(t)}$ for $T_2$ iterations may be updated;
3. In the third stage, $[R, t]^{(t)} = [R, t]^{(T_1+T_2)}$ is fixed and only $M^{(t)}$ may be updated for $T_3$ iterations.

This strategy searches for an approximate camera pose in early iterations, which may provide a better initialization for the later optimization of the position map.

Visual-Semantic Correlation (VSC) Networks

Figure 5:
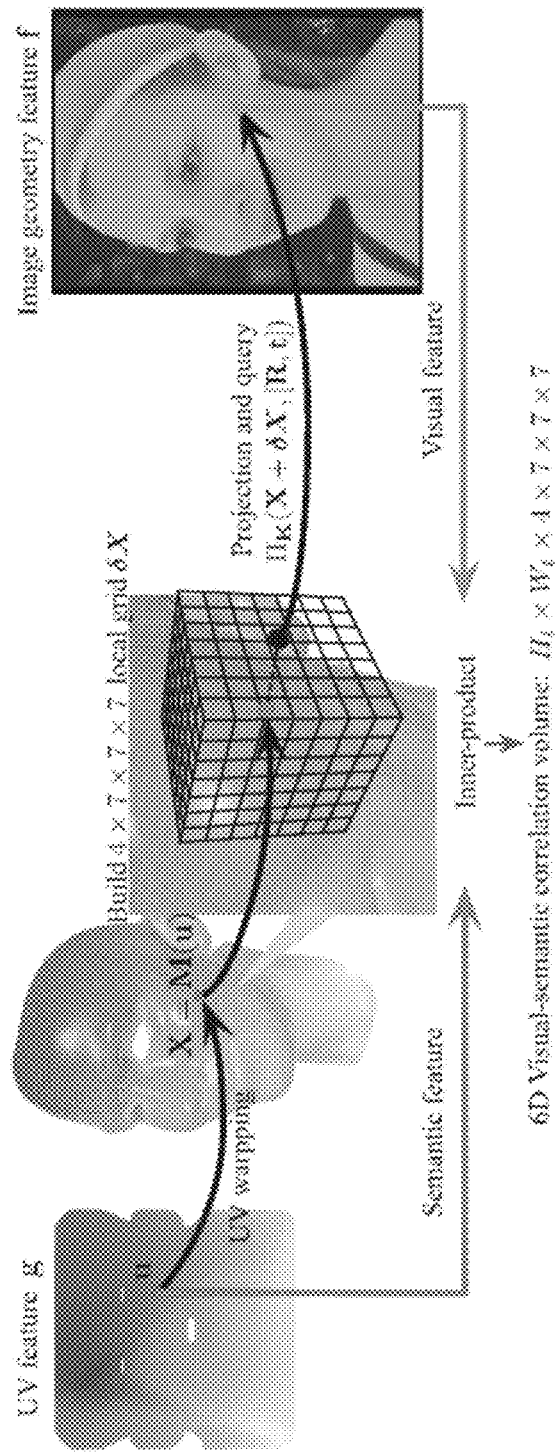
FIG. 5 illustrates a visual-semantic correlation (VSC) for preparing a 2D feature map according to embodiments herein.

To predict the update tuple $\Delta^{(t)}$, a 2D feature map containing the signals where $\delta M(u)^{(t)}$ and $[\delta q^{(t)} \delta t^{(t)}]$ should orient may be constructed in accordance with embodiments. FIG. 5 illustrates an exemplary visual-semantic correlation (VSC) method for preparing a 2D feature map according to embodiments herein. For example, in embodiments, FIG. 5 shows that a multi-scale 3D local grid may be built around the 3D position of each pixel in the UV space and the grid points projected to the image space. Then the 6D correlation may be computed and flattened to a 2D feature map.

In accordance with embodiments herein, for each pixel u in the UV space, a multi-scale 7×7×7 grid may be enumerated around the $M(u)^{(t)}$, the grid points to the image space may be projected using $[R, t]^{(t)}$, and the corresponding points at f and g may be compared. This process may be understood as a test on whether the mesh points represented by u should move to one of the 7×7×7 grid points. The visual-semantic similarities may be calculated as the inner-product between the geometry feature f and the UV feature g, in accordance with an embodiment, called Visual-Semantic Correlation (VSC) herein. Mathematically, this process is represented as $$\tilde{y}^{(t)}(u, s, i, j, k) = f\left(\prod_K \left(M^{(t)}(u) + 2^s c \begin{bmatrix} i \\ j \\ k \end{bmatrix}, [R, t]^{(t)}\right)\right) \cdot g(u), \tag{8}$$

where $\tilde{y}^{(t)}$ is the constructed feature map, u is a coordinate in the UV space, $s \in \{0,1,2,3\}$ controls the scale of the grid for generating a feature pyramid, $i,j,k \in \{-3, -2, ..., 3\}$ is the offset in the x-axis, $y$-axis, and $z$-axis, respectively, f and g are the feature maps introduced in Section 4.2, $\Pi$ is the projection operator introduced in Equation (2), c is a tunable constant controlling the size of the grid, and "·" is the inner-product operator.

Symmetry Awareness

Because some portion of the face may not be visible in the image $\tilde{y}^{(t)}(u,\cdot,\cdot,\cdot,\cdot)$, such might not carry meaningful information in these regions. To introduce clues into occluded areas, the advantage of the symmetry property of the face in the UV space may be utilized, in accordance with embodiments, and a new feature may be constructed by concatenating $\tilde{y}^{(t)}$ and its $u$-axis flipped variant:

$$\tilde{y}'^{(t)}\left(\begin{bmatrix} u \\ v \end{bmatrix}, s, i, j, k, l\right) = \begin{cases} \tilde{y}^{(t)}\left(\begin{bmatrix} u \\ v \end{bmatrix}, s, i, j, k\right) & l = 0 \\ \tilde{y}^{(t)}\left(\begin{bmatrix} \frac{w_t}{8}v - u \end{bmatrix}, s, i, j, k\right) & l = 1 \end{cases},$$

where $l \in \{0,1\}$ is the new added dimension. Finally, $\tilde{y}'^{(t)}$ may be flattened out along the dimensions of s, i, j, k, and l, passed through a 2D stacked hourglass network [30], and the resulting feature vector $y^{(t)}$ may be used as the output of the visual semantic correlation network.

Geometry Decoding Network

Given the hidden state $h^{(t)}$, the geometry decoding network outputs the quaternion $\delta q^{(t)} \in \mathbb{R}^4$, the translation correction vector $\delta t^{(t)} \in \mathbb{R}^3$ and the position correction map $\delta M^{(t)}$. To compute the pose updates, in accordance with some embodiments herein, $h^{(t)}$ may be down-sampled with 3 stride-2 convolutions. After that, the feature map may be globally average pooled and followed with two fully-connected layers to obtain $\delta q^{(t)}$ and $\delta t^{(t)}$. For the estimation of the residual of the position map $\delta M$, a standard stacked hourglass network may be utilized.

3) Texture Inference Network

Given the geometry predictions [R, t] and M, the disclosed texture inference network may predict textures in three steps, in accordance with embodiments herein. First, the texture feature $f_t$ from the image space may be unprojected back to the UV space, together with a visibility map. Then the symmetry prior in the UV space is utilized and the UV feature may be concatenated with its horizontally flipped counterpart, which is followed by a stacked hourglass network to predict the textures in low resolution. Finally, an upsampling network is used to create high-quality texture maps. In order to produce sharper and high-fidelity textures, in accordance with some embodiments herein, may be followed and a discriminator may be used to supervise the disclosed texture reconstruction.

Training Loss

In accordance with some embodiments herein, the disclosed network may be supervised using the ground truth camera pose $[R^{gt}, t^{gt}]$ and position map $M^{gt}$. For camera pose, in accordance with an embodiment, the matrix and vector $\ell_1$ losses between the prediction and the ground truth may be computed as follows:

$$L_{cam} = \sum_t \lVert R^{(t)} - R^{gt} \rVert 1 + \lVert t^{(t)} - t^{gt} \rVert_1,$$

For the position map, $M^{gt}$, in accordance with an embodiment, the dense $\ell_1$ loss between the prediction and the ground truth after applying the predicted transformation may be computed as follows:

$$L_M = \sum_t \sum_u \lVert R^{(t)} M^{(t)}(u) + t^{(t)} - R^{gt} M^{gt}(u) - t^{gt} \rVert_1.$$

In order to learn accurate and photo-realistic textures, in accordance with an embodiment, the disclosed network may be supervised with $L_1$, perception losses (vgg), and adversarial losses (adv) on A, D, and S:

$$L_t = \sum_{T \in \{A,D,S\}} \lVert T - T^{gt} \rVert_1 + vgg(T, T^{gt}) + adv(T, T^{gt}).$$

Overall, according to some embodiments, all modules may be trained with a multi-task loss as follows:

$$L = L_{cam} + L_M + L_t.$$

Figure 6:
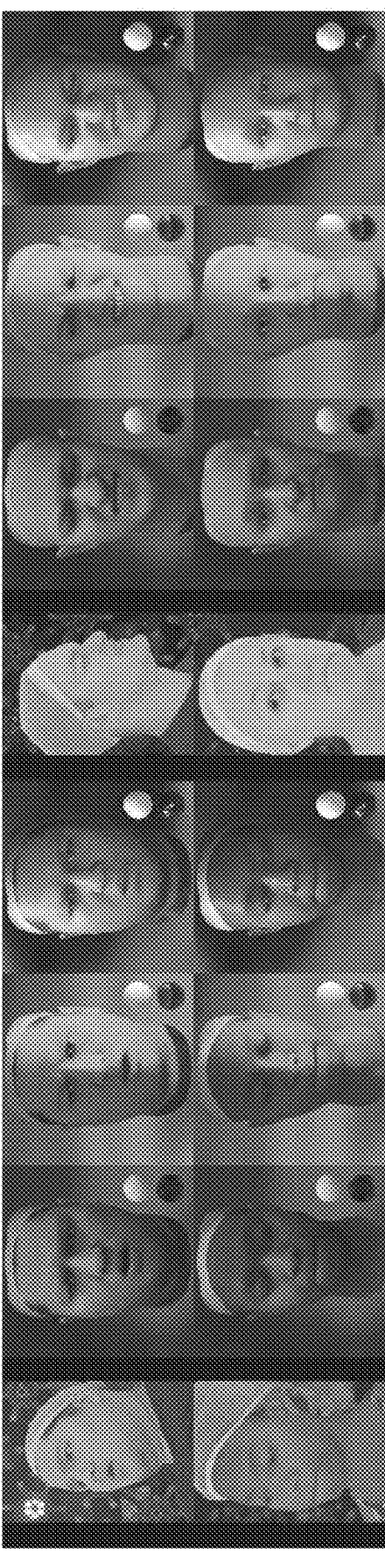
FIG. 6 shows examples of rendered images using the disclosed reconstructed face assets in DIFF according to embodiments herein.

FIG. 6 shows examples of resulting rendered images using the disclosed reconstructed face assets according to embodiments herein. FIG. 6 shows an example of the quality of the disclosed reconstructed model and images rendered using the disclosed reconstructed face assets. For each input testing image, shown are exemplary images rendered using Maya Arnold under different illuminations, i.e., three HDRI lighting.

Experiment Setups

Implementation Details

In some embodiments, one or more operations described herein may be implemented in PyTorch. In some embodiments, one or more operations described herein may be used to train the disclosed network from scratch using Adam for 30 epochs with a learning rate of $3 \times 10^{-4}$. The resolution of the UV space set is to $H_r \times W_r = 512 \times 512$, in accordance with some embodiments. The recurrent face geometry optimizer may use 16 iterations with $T_1 = 4$, T2 =4, and $T_3 = 8$, according to some embodiments. The VSC grid size is c=3 mm, in accordance with some embodiments. During training, the data may be augmented with arbitrary illumination, camera pose, camera intrinsics, and/or backgrounds using photo-realistic rendering, according to some embodiments.

Evaluation Metrics

Accuracy and completeness of the reconstructed face geometry disclosed herein has been evaluated. Given a reconstructed mesh, in accordance with some embodiments, the mesh may be first rigidly aligned to the ground truth following. Specifically, in one non-limiting embodiment, procrustes may be performed using 7 landmarks, which is followed by an ICP algorithm. Then, the point-to-surface distances from the ground truth vertices to the predicted mesh may be calculated. For accuracy, in accordance with some embodiments, the mean and median distances may be computed. To further investigate the performances, in accordance with some embodiments, the cumulative distribution function (CDF) of the distances may also be plotted and the percentage under 1 mm, 2 mm, and 5 mm may be calculated.

Ablation Study

Table 1 (below) investigates some examples of the effectiveness of the disclosed core building blocks: multi-stage optimization, feature correlation matching, and symmetry-aware fusion (DIFF-sym), in accordance with embodiments herein. "DIFF-MS" is denoted as a variant of DIFF that only contains a single optimization stage, where the geometry and the camera pose are updated simultaneously in all iterations. The performance gap between DIFF-MS and DIFF validates the use of the multi-stage optimization. Then, the disclosed visual-semantic correlation (VSC) network is replaced with a naive regression network, denoted as "DIFF-corr". The results in DIFF and DIFF-corr show that the VSC network enables and results in accurate geometry reconstruction. Finally, the symmetry-based feature fusion ("DIFF-sym") is removed. The performance gap between DIFF-sym and DIFF indicates that the symmetry prior for occluded regions plays a role in accurate shape reconstruction.

TABLE 1

| Ablation study on the disclosed Face Asset Dataset | | | | | |
|---|---|---|---|---|---|
| | <1 mm | <2 mm | <5 mm | Mean (mm) | Med. (mm) |
| DIFF-MS | 25.96 | 48.48 | 84.56 | 2.980 | 2.076 |
| DIFF-corr | 35.88 | 62.41 | 91.20 | 2.241 | 1.477 |
| DIFF-sym | 34.99 | 61.23 | 90.73 | 2.283 | 1.519 |
| DIFF (Full) | 46.17 | 73.78 | 95.09 | 1.692 | 1.104 |

Comparisons on FAD Test Set

Baselines

Data from the disclosed methods and systems may be compared to prior methods to illustrate improvements and advantages discussed herein. As an example, data obtained from the disclosed method DIFF according to an exemplary embodiment has been compared with 8 other prior art baselines: 3DDFAv2, Nonlinear3DMM, DECA, SADRN, MelnGame, MGCNet, RingNet, and Deep3DFaceRecon.

Quantitative Comparisons

Figure 7:
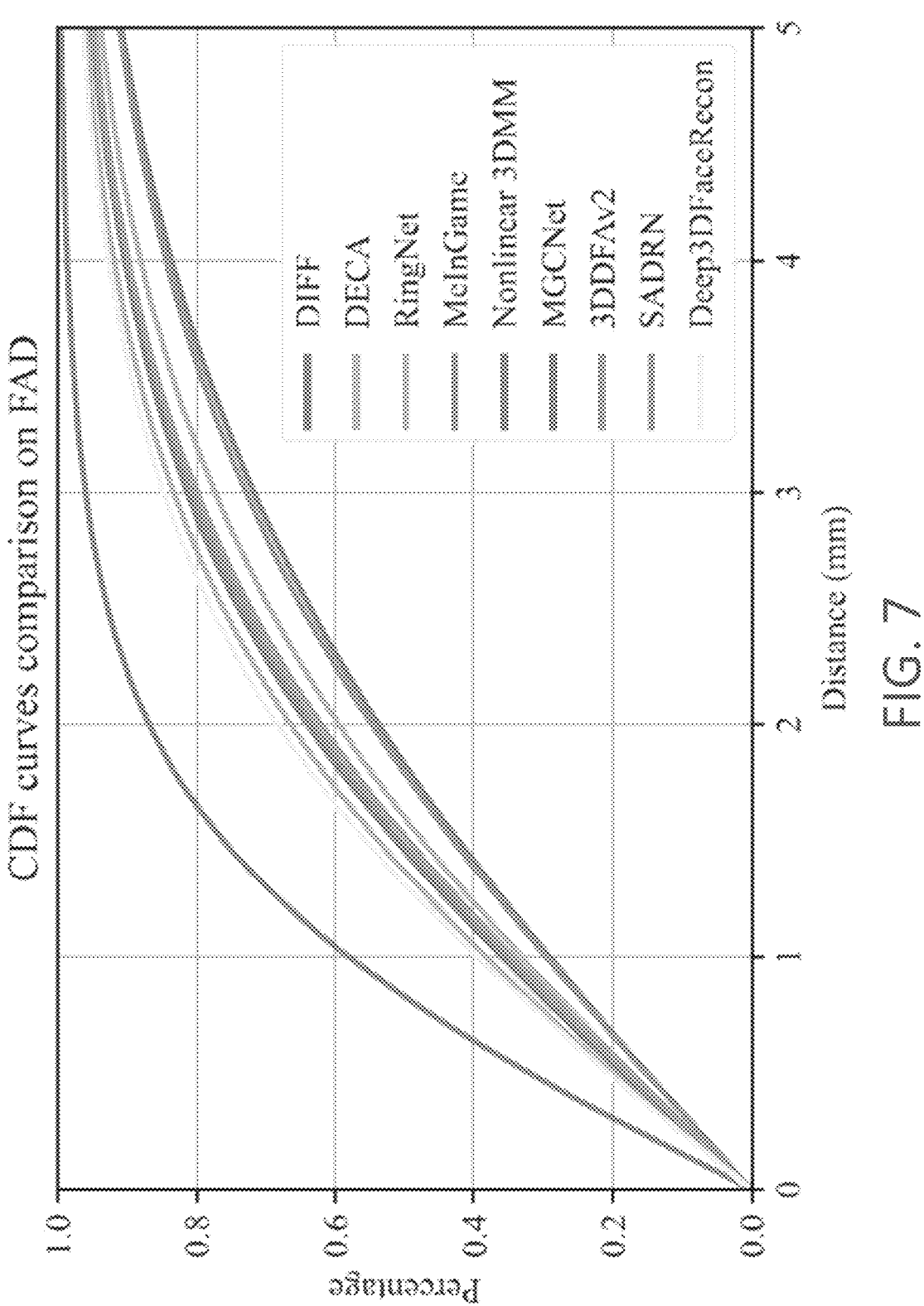
FIG. 7 illustrates a quantitative comparison of exemplary baseline methods and the disclosed Face Asset Dataset (FAD), DIFF according to embodiments herein.

Specifically, Table 2 (below) and FIG. 7 show a quantitative comparison with the aforementioned exemplary baseline methods and FAD dataset as produced by DIFF. FIG. 7 provides CDF curves comparison on the FAD dataset, based on percentage v. distance (mm). As shown, DIFF outperforms all the exemplary (eight) baseline methods on the testing images by a large margin. In particular, in accordance with one embodiment, approximately 63.4% improvements may be obtained.

TABLE 2

| Comparison on Face Asset Dataset. | | | | | |
|---|---|---|---|---|---|
| | <1 mm | <2 mm | <5 mm | Mean (mm) | Med. (mm) |
| Nonlinear3DMM | 29.24 | 53.69 | 90.83 | 2.305 | 1.831 |
| MGCNet | 36.03 | 63.94 | 94.74 | 1.896 | 1.455 |
| 3DDFAv2 | 34.52 | 62.05 | 94.79 | 1.926 | 1.520 |
| MelnGame | 35.65 | 63.16 | 95.22 | 1.885 | 1.476 |
| SADRN | 29.63 | 54.69 | 91.14 | 2.288 | 1.792 |
| RingNet | 33.17 | 59.48 | 93.85 | 2.024 | 1.601 |
| Deep3DFaceRecon | 39.60 | 68.31 | 96.52 | 1.695 | 1.313 |
| DECA | 38.28 | 66.40 | 95.98 | 1.752 | 1.367 |
| DIFF | 58.16 | 86.82 | 99.50 | 1.057 | 0.083 |

Qualitative Results

Figure 8:
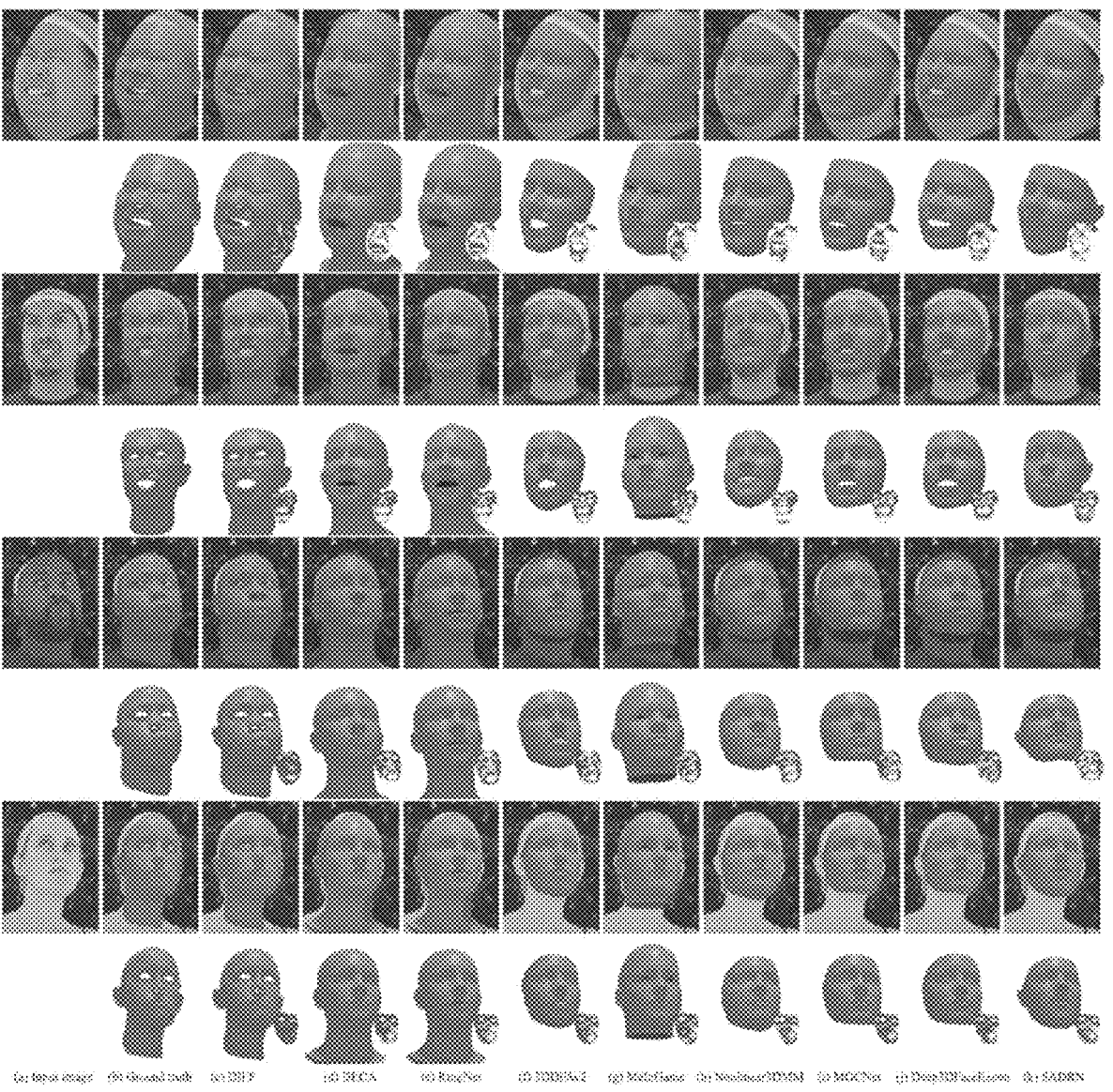
FIG. 8 shows a comparison of face geometry reconstruction from a single image on the disclosed FAD in rows and columns depicting, from left to right: (a) input image, (b) ground truth mesh, results of (c) the disclosure, and prior arts methods in (d), (e), (f), (g), (h), (i), (j), and (k).

An exemplary comparison overlay is shown in FIG. 8. More specifically, FIG. 8 shows a comparison of face geometry reconstruction from a single image on the disclosed FAD dataset in rows and columns depicting, from left to right: (a) input image, (b) ground truth mesh, results of (c) the disclosure, and prior arts methods in (d) DECA, (e) RingNet, (f) 3DDFAv2, (g) MelnGame, (h) Nonlinear3DMM, (i) MGCNet, (j) Deep3DFaceRecon, and (k) SADRN. For each testing subject, the overlay in the upper row and the geometry along with the error map in the lower row is visualized, wherein darker color represents lower error. The disclosed model is able to reconstruct the non-linear deformation of a face with large expressions, thereby indicating the flexibility and capability of the disclosed deformation space for modeling details compared to existing methods with limited parametric space.

Generalization

Figure 9:
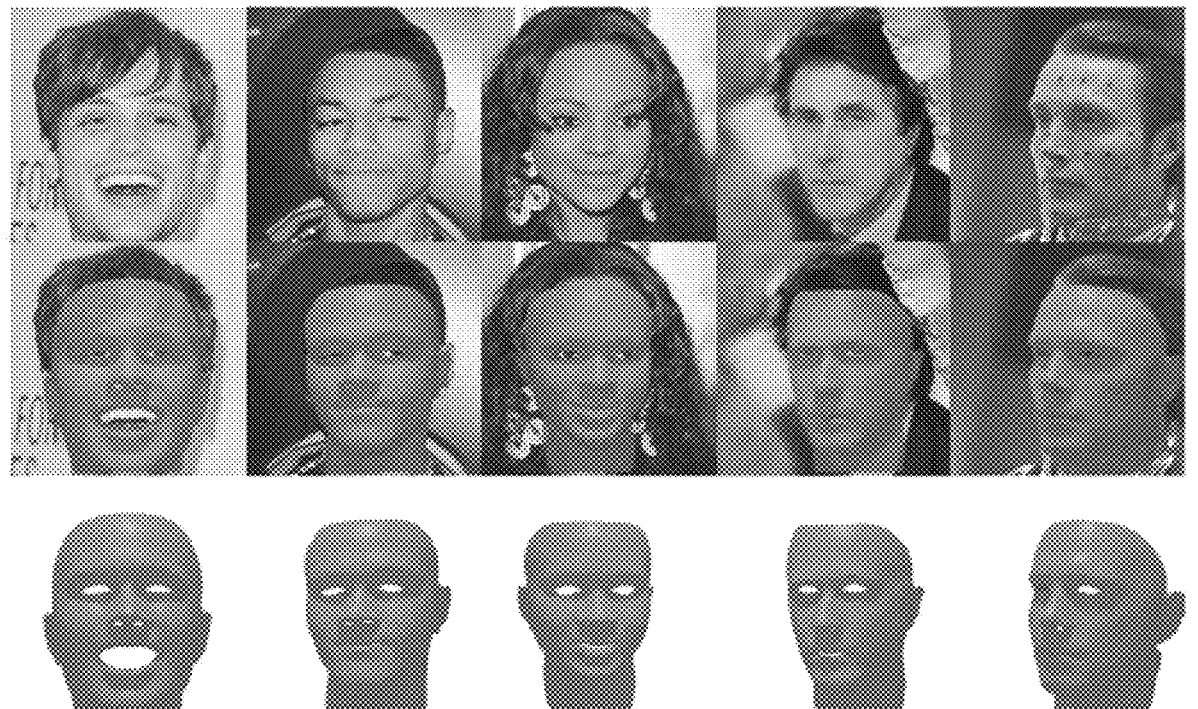
FIG. 9 shows reconstruction results of the disclosed DIFF model on in-the-wild images according to embodiments herein.

FIG. 9 shows reconstruction results of the disclosed DIFF model on in-the-wild images (e.g., images from celebA). The disclosed model predicts the face geometry and the camera pose, which allows for directly rendering the geometries that overlay the input image. Such results may be achieved with less than 200 training subjects, which demonstrates the generalizability of the disclosed model across identity, thanks to iterative correlation design that learns the local semantic features.

Recurrent Feature Alignment (ReFA)

Figure 10:
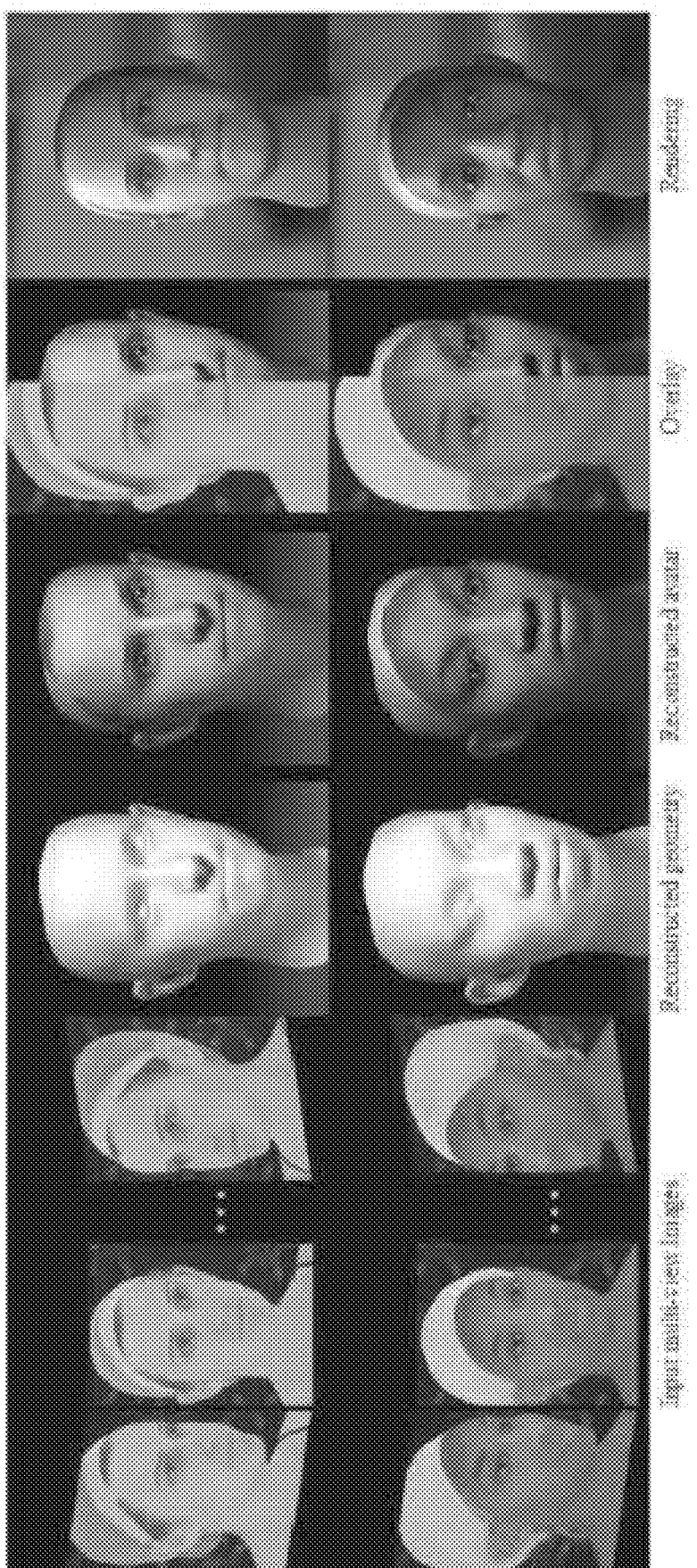
FIG. 10 shows exemplary rows with steps (in columns) of another method for producing production-ready face assets from multi-view images according to embodiments herein.

FIGS. 10-23 refer to another, non-limiting embodiment relating to an end-to-end neural network for production-ready face assets creation from multi-view images. Such steps and/or processes may be implemented by the one or more computer systems CS of FIG. 1, for example, according to embodiments herein. FIG. 10 shows rows depicting, in columns from left to right, exemplary input multi-view images (in the illustrated example, there are three), reconstructed geometry, a reconstructed avatar, an overlay, and a rendering prepared using this disclosure, according to embodiments herein. In embodiments, ReFA provides an efficiency at 4.5 frame per second. As detailed below, the inferred assets provided by this disclosure may contain both pore level geometry and a skin reflectance property maps (specularity and diffuse maps), allowing physically-based renderings in various lighting conditions. Further, the disclosed framework may be fully automatic: the results shown are direct output of the designed neural network without any manual editing and post processing.

For example, to achieve the goals mentioned previously, in accordance with embodiments, the training dataset may be captured by a Light Stage scan system, which achieves pore-level accuracy in both geometry and reflectance maps by combining photometric stereo reconstruction and polarization promotion. In a non-limiting and exemplary embodiment, the present disclosure introduces a camera setup of 25 Ximea machine vision cameras, including 17 monochrome and 8 color cameras. The monochrome cameras, compared to their color counterparts, support more efficient and higher resolution capturing, allowing for sub-millimeter geometry details, albedo, and specular reflectance reconstruction. The additional color cameras may aid in stereo-based mesh reconstruction. The RGB color in the captured images may be obtained by adding successive monochrome images recorded under different illumination colors. A FACS set may be devised as part of this disclosure, in accordance with some embodiments, which combines 40 action units to a condensed set of 26 expressions for each of the subjects to perform. A total number of 75 subjects, ranging from age 18 to 67, were scanned as part of an exemplary embodiment. To increase diversity, in accordance with some embodiments, the dataset may be combined with a selection of 99 Triplegangers subjects, each with 20 expressions.

Data Preparation

Starting from the multi-view images, in an embodiment, first the base mesh may be reconstructed under a neutral expression scan using a multi-view stereo (MVS) algorithm. Then a 3D morphable model may be used for the fitting of the mesh, which results in a registered mesh and a head pose. A non-rigid Laplacian deformation may also be performed to minimize the surface-to-surface distance further, in accordance with embodiments. For reconstructing shapes with facial expressions, in accordance with embodiments, first a set of generic blendshapes may be adopted to fit the scanned mesh and then a non-rigid mesh registration may be performed. Additionally, image-space optical flow from neutral to other expressions is added as a dense consistency constraint in the non-rigid Laplacian deformation step to retain texture space and surface correspondence. All the processed geometries and textures share the same topology and thus have dense vertex-level correspondence.

The diffuse-specular separation is computed under a known spherical illumination technique, according to embodiments. Pore-level details of the geometry may be computed by employing albedo and normal maps in the stereo reconstruction and represented as displacement maps to the base mesh, in accordance with embodiments. The full set of the generic model may include a base geometry, a head pose, and texture maps (albedo, specular intensity, and displacement) encoded in 4K resolution. 3D vertex positions are rasterized to a three-channel HDR bitmap of 256×256 pixels resolution to enable joint learning of the correlation between geometry and albedo, according to embodiments herein. In embodiments, 16 camera views are used for the default setting to infer the face assets with the disclosed neural network.

Figure 11:
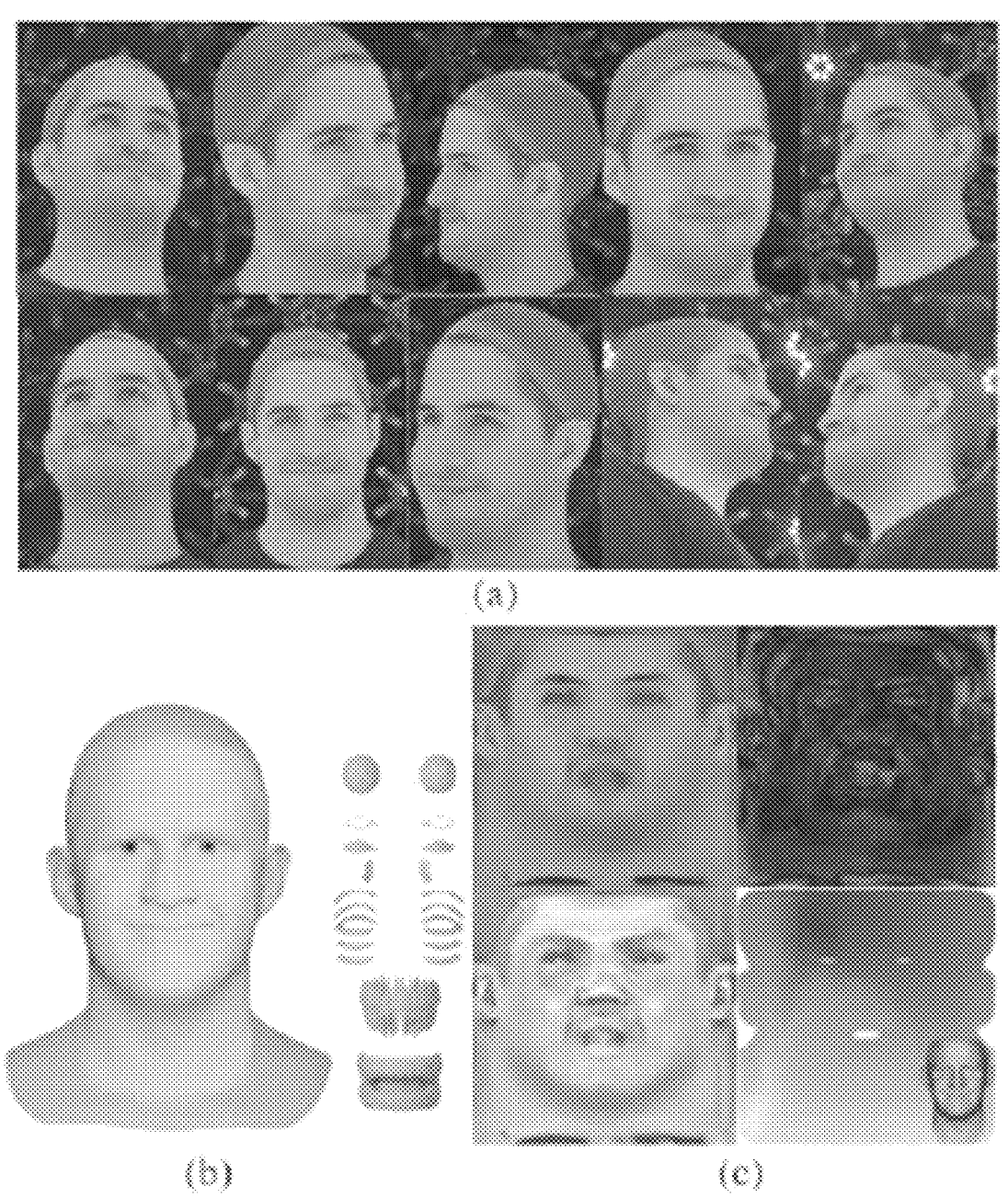
FIG. 11 shows an example of captured multi-view images and a full set of processed face assets (labeled as (a), (b) and (c)) used for training, in accordance with embodiments herein.

FIG. 11 shows an example of captured multi-view images and a full set of processed face assets that is used for training in accordance with embodiments. In FIG. 11, (a) represents an exemplary set of selected views of captured images as input, (b) represents a model (processed geometry), in the form of a 3D mesh, of a face, head, and neck, as well as teeth, gums, eyeballs, eye blending, lacrimal fluid, eye occlusion, and eyelashes used in the disclosure, and (c) represents a produced 4K×4K map of physically-based skin properties: i.e., albedo (bottom-left), specular (top-left), and displacement maps (top-right) , converted from the 3D mesh in (b), used for geometry supervision. The geometry is represented in UV space. Based on a set of handcrafted blendshapes with all the primary and secondary parts, the reconstructed mesh in (b) may be linearly fit by computing of the blending weights. These blend weights will drive the secondary components to travel with primary parts, such that the eyelashes will travel with eyelids. Except for the eyeball, other secondary parts share a set of generic textures for all the subjects. For eyeball, an eyeball assets database may be adopted with 90 different pupil patterns to match with input subjects, in accordance with embodiments.

The dataset is split into 45 for the training and 19 for the evaluation according to embodiments herein. Each set of capture contains a neutral face and 26 expressions, including extreme face deformation, asymmetrical motions and subtle expressions in accordance with embodiments.

Figure 12:
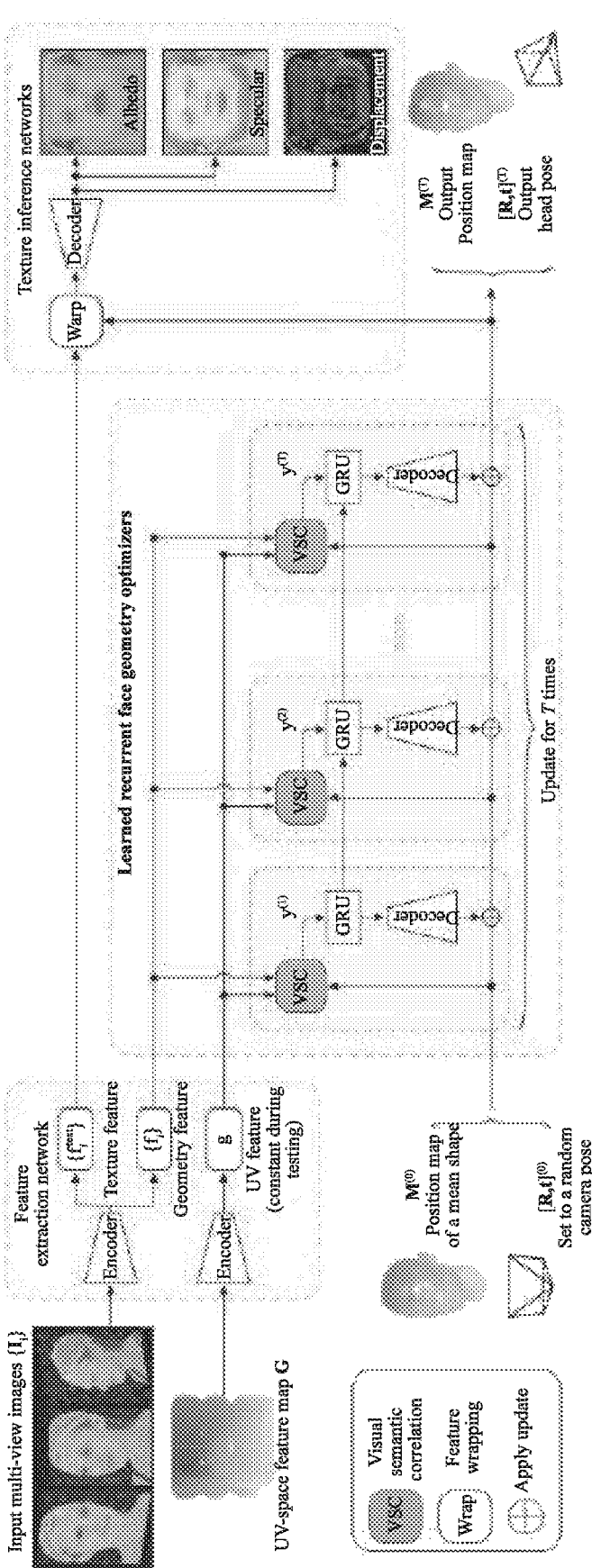
FIG. 12 illustrates an overview of an exemplary pipeline for ReFA for given multi-view images when processed by the disclosed method and system, according to embodiments herein.

FIG. 12 illustrates an overview of an exemplary pipeline for given multi-view images when processed by the disclosed ReFA method and system, according to embodiments herein. As shown and as will be described in greater detail, in accordance with some embodiments, the disclosed ReFA end-to-end system takes multi-view images and a predefined template UV positional map in a canonical space as input and produces: an updated position map, estimated head pose (3D rotation and translation) parameters to rigidly align the updated position map in camera space to the canonical template space, and texture maps including the albedo map, the specular map, and the displacement map. The ReFA model recurrently optimizes for the facial geometry and the head pose based on computation of visual-semantic correlation (VSC) and utilizes the pixel-aligned signals learned thereof for high-resolution texture inference.

According to embodiments herein, to support direct use for animation, the position map and the texture maps may form the entire face assets for realistic rendering and are all conveniently defined in the same (or up-sampled) UV space. Detailed below are representations of the aforementioned entities as well as the camera model. Further subsequent details are dedicated to each of the three main components of the disclosed system and the pipeline of FIG. 12: (1) the feature extraction network(s) that extract features for both the input images and a predefined UV-space feature map; (2) the recurrent face geometry network(s) that take the output of the feature extraction network and use a learned neural optimizer to iteratively refine the geometry from an initial condition to a finer shape; and (3) the texture inference network(s) that take the inferred geometry and the multi-view texture features to infer the high resolution texture maps.

Preliminaries

Data Format

Table 3 (below) specifies exemplary symbols and formats of the input and output data involved in the disclosed pipeline, according to embodiments herein. In addition to the details provided in the Table, the input multi-view images are indexed by the camera view:

$$\{I_i\}_{i=1}^{K}$$

from K views with known camera calibrations $\{P_i | P_i \in R^{3 \times 4}\}$. All feature maps are bilinearly sampled given real-valued coordinates.

Geometry Representation

The position, map M is the representation of the face geometry. M comes with a UV mapping from a template mesh topology, and thus each pixel on M is mapped to a vertex or a surface point of a 3D mesh. All the scanned meshes with different identities and expressions share the same UV mapping. Furthermore, each pixel in M stores the $R^3$ coordinates of its location in the canonical space. It therefore suffices to define a high-resolution geometry given a dense mesh and a UV mapping, as converting the position map to a 3D mesh simply amounts to setting the vertex positions of the mesh.

TABLE 3

| Name | Symbol | Dimensions |
| --- | --- | --- |
| Input multi-view images | I | $R^{H \times W \times 3}$ |
| Camera parameters | P | $R^{3 \times 4}$ |
| Head pose | [R, t] | $R^{3 \times 4}$ |
| UV-space position map | M | $R^{H_P \times W_P \times 3}$ |
| UV-space albedo map | A | $R^{8H_P \times 8W_P \times 3}$ |
| UV-space specular map | S | $R^{8H_P \times 8W_t}$ |
| UV-space displacement map | D | $R^{8H_P \times 8W_t}$ |

The UV-space representation of the geometry is in particular amenable to shape inference with a neural network, as the position map links the geometry space to a texture space that can be processed by 2D convolutional neural networks effectively. Since each pixel in M corresponds to a mesh vertex, a position map M of 512×512 resolution supports a dense geometry of up to 2.6 M vertices. Thus, the disclosed position map provides a powerful geometry representation that enables inference of highly detailed face assets.

The disclosed system uses a common UV space across all the subjects and the expressions, according to embodiments herein. This ensures that all the inferred geometries are registered. An additional advantage of this disclosure is that the method/system may use, in embodiments, any mesh topology that embraces the same UV mapping to sample from the position map and recover the vertex coordinates. That is, the method/system may use a mesh with well-defined faces "f" and vertex texture coordinates "vt" but without vertex coordinates "v", according to embodiments herein.

Camera Model

The pinhole camera model is followed, according to embodiments herein. For a 3D point $X=|X, Y, Z|^T \in R^3$ in the world space, its projection on the image plane $x=|X, Y, Z|^T$ may be computed as: $z \cdot |x, y, 1=P \cdot |X, Y, Z|^T$ where $P \in R^{3 \times 4}$ is the camera parameters including the intrinsic and extrinsic matrices. For convenience, this relationship is denoted as:

$$x = \Pi p(X) \tag{1}$$

1) Feature Extraction Network(s)

Image Space Features
From the input multi-view images $$\{I_i\}_{i=1}^K,$$

according to embodiments, this disclosure may use a Res-Net-like backbone network to extract 2D features at ½ of the image resolution. The output is split into two branches: the geometry feature $$f_i \in R^{\frac{W}{8} \times \frac{H}{8} \times C}$$

and the texture feature $$f_i^{text} \in R^{\frac{W}{8} \times \frac{H}{8} \times C_r}$$

given the view index i. The geometry feature map is used for estimating the head pose, represented as a 6-DoF rigid transformation [R, t], and the position map M (Section 4.3). The texture feature map is used for generating high-resolution texture maps including albedo maps A, specular maps S, and displacement maps D (Section 4.4).

UV Space Features

Figure 13:
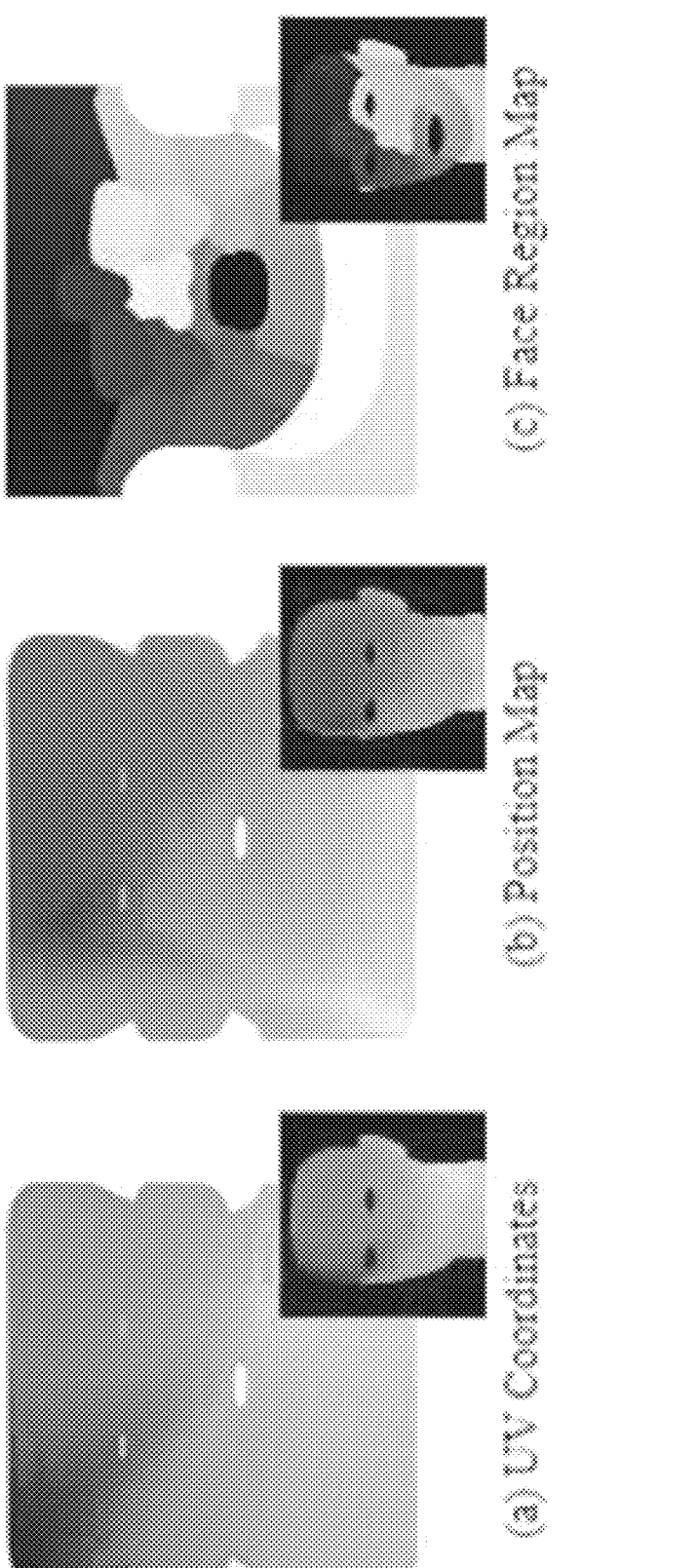
FIG. 13 shows an example of composing UV-space feature G, in columns depicting, from left to right: (a) UV coordinates, (b), position map, and (c) face region map, in accordance with embodiments herein.

FIG. 13 shows an example of composing UV-space feature G, in columns depicting, from left to right: (a) UV coordinates, (b), position map (of a mean shape), and (c) face region map, in accordance with embodiments herein. As shown in FIG. 13, from the template mesh and its UV mapping, the UV-space feature map $G \in R^{W_i \times H_i \times 36}$ may be assembled by concatenating the following features for each pixel u: (1) the 2D coordinates of u itself, normalized to $[-1,1]^2$ (a); (2) the corresponding 3D coordinates of u in the mean face mesh (b); (3) the one-hot encoding of its face region, where according to one non-limiting embodiment, there is manual creation of a semantic face region map, e.g., including 31 regions (c). The composition serves to encode the facial semantics and the geometry priors necessary for the future steps. The feature G may be processed according to embodiments using a convolutional neural network and get the resulting UV space feature map $$\in R^{\frac{W_t}{8} \times \frac{H_t}{8} \times C}.$$

Since G is a constant, the UV feature map g can also be understood as a trainable parameter, which is regularized by the CNN architecture and the construction of G. Once trained, the neural network may be discarded and G is set as a fixed constant.

2) Recurrent Face Geometry Network(s)/Optimizer

In accordance with embodiments, the disclosed network may tackle the reconstruction task by solving an alignment problem. A UV-space position map that represents the geometry may be first initialized to be the mean face shape, according to embodiments. In a practical face capturing setting, the pose of the head relative to the geometry defined by the position map is unknown, so the head pose is initialized as a random pose that is visible in all cameras. The initialized face geometry, when projected to the image space, will show misalignment with the underlying geometry depicted in the multi-view images. For instance, a projection of the eye on the initialized face geometry is likely not aligned with the actual eye location in the image space. The disclosed framework thus optimizes the face geometry iteratively, such that the projection of the face in the UV space gradually converge to the ground truth locations in all image views. In order to solve the alignment problem, the features in the UV space and the image space are joined in a unified feature space, such that the corresponding locations in both spaces are trained to encode similar features. A dense all-pair correlation may be computed between the UV space and the image space and a recurrent neural network may be used to find the optimal matching in the correlation tensor, according to embodiments herein.

Once the optimal matching is found in this process, the shape depicted by the position map naturally reconstructs the shape depicted in the multi-view images.

In each network step, according to embodiments, the position map M may be updated as well as the head pose [R, t] separately, given the correlation tensor between the two misaligned feature maps of interest, namely the UV feature map g and the image space feature f. Herein in this disclosure, the optimizer that performs such actions is referred to as the Recurrent Face Geometry Optimizer. In the following paragraphs, there is described in detail how the disclosed optimizer initializes, updates, and finalizes the corrections in order to recover M and [R, t] according to embodiments herein.

Initialization

The head pose may be initialized with a randomly selected rotation and translation of the mean camera distance ($\approx 1.3$ meters) according to embodiments herein. Also initialized may be the position map as the mean shape $M^0 = M$. Such design is due to the fact that the captured subjects' head may turn from an upright position in a more practical setting. In other words, there is no assumption that the absolute pose of the head is known.

Compute Gradient

The Recurrent Face Geometry Optimizer may be based on a recurrent neural network (RNN) composed of Gated Recurrent Units (GRU), according to non-limiting embodiments herein, which computes the gradient on the pose (rotation R, translation t) and the geometry (position map M). At the t-th step, the neural network process could be written as:

$$y^{(t)} \leftarrow VSC(\{f_i\}_{i=1}^K, g, R^{(t-1)}, t^{(t-1)}, M^{(t-1)}, \qquad (2)$$

$$h^{(t)} \leftarrow GRU(y^{(t)}, h^{(t-1)}), \qquad (3)$$

$$\Delta^{(t)} \leftarrow \text{Decoder}(h^{(t)}). \qquad (4)$$

In Equation (2), the disclosed Visual Semantic Correlation (VSC) network matches the UV space feature and the image space feature, and produces a correlation feature map $$y^{(t)} \in \mathbb{R}^{\frac{W_I}{8} \times \frac{H_I}{8} \times C_{VSC}}.$$

Next, $y^{(t)}$ is fed to a GRU-based RNN [Cho et al. 2014] and the hidden state $h^{(t)}$ is updated from the previous $h^{(t-1)}$ in Equation (3). Then, the *Geometry Decoding Network* (Section 4.3.2) processes the hidden vector $h^{(t)}$ and computes the geometry update tuple $\Delta^{(t)}=(\delta R^{(t)}, \delta t^{(t)}, \delta M^{(t)})$. The update tuple is applied by $$
\begin{aligned}
R^{(t)} &\leftarrow R^{(t-1)} \cdot \delta R^{(t)} \\
t^{(t)} &\leftarrow t^{(t-1)} + \delta t^{(t)} \\
M^{(t)} &\leftarrow M^{(t-1)} + \delta M^{(t)}
\end{aligned} \qquad (5)
$$

Given the total iterations T, the final output of the optimizer is simply $[R, t]^{(T)}$ and $M^{(T)}$.

Visual-Semantic Correlation (VSC) Networks

Figure 14:
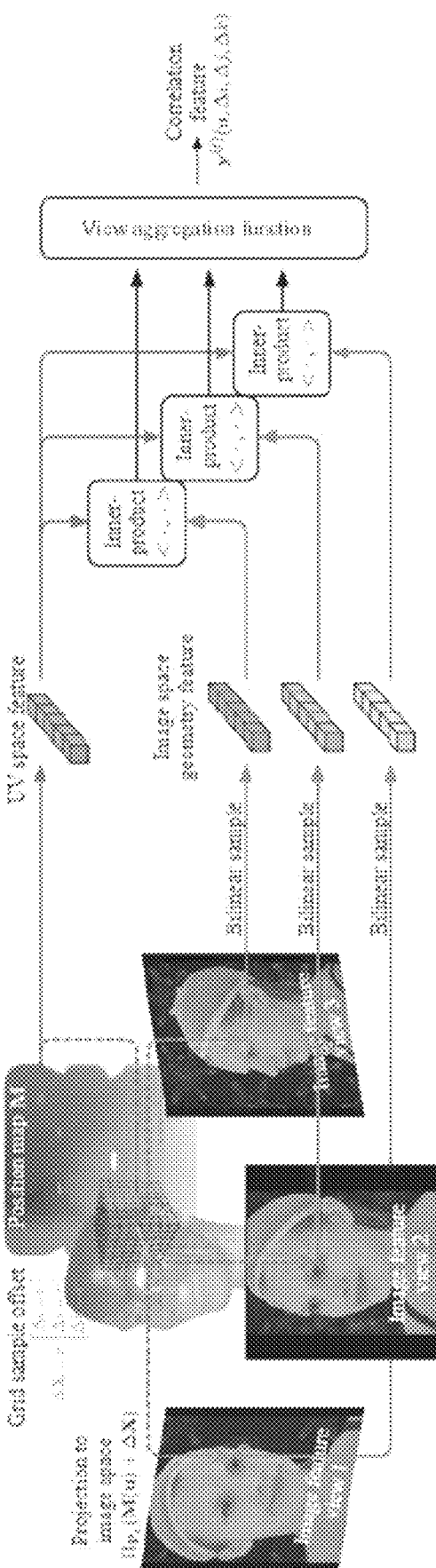
FIG. 14 illustrates a visual-semantic correlation (VSC) for preparing a 2D feature map according to embodiments herein.

To predict the update tuple, according to embodiments, a 2D feature map is constructed containing the signals where $\delta M^{(t)}$ and $[\delta R^{(t)}, \delta t^{(t)}]$ should orient. FIG. 14 illustrates a visual-semantic correlation (VSC) for preparing a 2D feature map according to embodiments herein. For example, in embodiments, FIG. 14 shows that a multi-scale 3D local grid may be built around the 3D position of each pixel in the UV-space position map. The volume of correlation feature may then be constructed by taking the inner product between each UV-space feature in the local grid and its projected features in the multi-view image space. The correlation feature is a local representation of the alignment between the observed visual information and the semantic priors.

In embodiments, the 2D feature map computes similarity between the multi-view geometry features f and the UV features g by constructing a correlation volume. Specifically, let $\hat{M}^{(t)}=R^{(t)}M^{(t)}+t^{(t)}$ be the transformed position map at t-th step, this disclosure first enumerates a 3D regular grid of size $(2r+1) \times (2r+1) \times (2r+1)$ around $M^{(t)}$ (u) for each pixel u in the UV space, where $r \in \mathbb{N}$ is the grid resolution. Then the grid points may be projected to the image space using the camera parameters $P_i$, and the features compared between the corresponding points in the image space of f and the UV space of g. In embodiments, bilinear sampling is used to sample the feature at non-integer indices in both spaces, and calculate the similarity as the inner-product between two features: the UV features that contain semantic information, and the image features that contain visual information, i.e., called Visual-Semantic Correlation (VSC) herein. Mathematically, this process is represented as $$\tilde{y}_i^{(t)}(u, \Delta i, \Delta j, \Delta k) = \left\langle f_i\left(\prod_{P_i}\left(\hat{M}^{(t)}(u) + c\begin{bmatrix} \Delta i - r \\ \Delta j - r \\ \Delta k - r \end{bmatrix}\right)\right), g(u)\right\rangle, \qquad (6)$$

where $$\bar{y}_i^{(t)}$$

is the constructed SD correlation tensor for i-th camera view, $f_i$ and g are the feature maps introduced in Section 4.2, $\Pi_{P_i}$ is the projection operator introduced in Equation (1), u is the 2D coordinates in the UV space, r is the grid resolution, c is the searching radius controlling the grid size, $\Delta i, \Delta j, \Delta k \in \{1, 2, \ldots 2r+1\}$ is the offset in the x-axis, y-axis, and z-axis, respectively, and $\langle \cdot, \cdot \rangle$ is the inner-product operator. The constructed 5D correlation tensor may be understood as guidance features for drawing the 3D points, represented by $M^{(t)}$ (u), to new locations. After the correlation tensor $\tilde{y}^{(t)}$ is computed, such may be flattened along the dimensions of $\Delta i$, $\Delta j$, and $\Delta k$. Finally, the flattened features at each view may be fused by a chosen aggregation function $\sigma$ to produce the input feature to the decoder, for which the max pooling function is chosen:

$$y^{(t)} = \sigma(\tilde{y}_0^{(t)}, \ldots, \tilde{y}_K^{(t)}) \qquad (7)$$

Geometry Decoding Network

The decoder, termed Geometry Decoding Network, decodes the hidden state $h^{(t)}$ into 1) a 7D vector representing correction to the head pose: 4D quaternion, which may then be converted to a rotation matrix $\delta R^{(t)} \in \mathbb{R}^{3 \times 3}$, and 3D translation $\delta t^{(t)} \in \mathbb{R}^3$, and 2) correction to the position map $\delta M^{(t)}$. To compute the updates to the head pose, in embodiments, $h^{(t)}$ is down-sampled with 3 2-stride convolutions, followed by a global average pool and two fully-connected layers. Updates to the position map may be processed by a standard stacked hourglass network according to embodiments herein.

3) Texture Inference Network

The goal of the texture inference in the ReFA method is to predict the UV-space albedo map A, specular map S and displacement map D from the input images and the inferred geometry. Being able to predict geometry in the UV space, the disclosed formulation offers a direct benefit to the texture inference module, as the pixel-aligned signals between the UV space and the multi-view inputs arc already prepared in the previous geometry inference step. The high-resolution texture maps are inferred based on the image texture features reprojected back to the UV space. Given the coordinates u in the UV space, the multiview camera poses $$\{p_i\}_{i=1}^K,$$

the inferred position map $M^{(T)}$, and the inferred head pose $[R,t]^{(T)}$, the pixel-aligned features for each view may be obtained as:

$$\tilde{y}_i^{text}(u) = f_i^{text}\left(\prod_{P_i}(R^{(T)}M^{(T)}(u) + t^{(T)})\right), \qquad (8)$$

where $f^{text}$ is the texture feature map introduced previously. In embodiments, the feature map may be indexed using bilinear sampling for non-integer coordinates. Similar to the disclosed face geometry module, in embodiments, the UV-space features may be aggregate with the aggregation function:

$$y^{text}(u) = \sigma(\bar{y}_1^{text}(u), \ldots, \bar{y}_K^{text}(u)). \tag{9}$$

where $\sigma$ is the aggregation function that aggregates the pixel-wise feature across all views, which could be max, min, var, etc. Once the reprojected feature is obtained, three independent decoders regress A, S, D simultaneously in the UV space in a coarse-to-fine fashion. Specifically, according to embodiments herein, first stacked hourglass networks were employed to regress the diffuse albedo, specular and displacement maps in 512×512 resolution. Then three consecutive image upsampling networks were used to upsample the texture maps to 1024×1024, 2048×2048, and 4096×4096, respectively. For diffuse albedo networks, tanh is used as the activation function, while herein no activation functions were added for the specular networks and displacement networks. The distribution discrepancy is large for different texture map representations, although they are defined in the same UV space. Thus, the network parameters for the decoders are not shared for different map representations. In order to produce sharp and high-fidelity textures, prior art methods may be followed to use an adversarial loss in addition to the reconstruction loss for the training of the texture reconstruction, according to embodiments herein.

Training Loss

The training of the face geometry may be supervised using the ground truth head pose $[R,t]^{gt}$ and position map $M^{gt}$ according to embodiments herein. Both are supervised with a $L_1$ loss between the prediction and the ground truth, which is summed over all iterations. For the head pose, the loss function may be computed as:

$$L_P = \sum_t \left\| R^{(t)} - R^{gt} \right\|_1 + \left\| t^{(t)} - t^{gt} \right\|_1.$$

For the position map, the network may be supervised with a dense $L_1$ loss computed between the predicted position map and the ground truth after applying the corresponding head pose transformation:

$$L_M = \sum_t \sum_u \left\| R^{(t)} M^{(t)} + t^{(t)} - R^{gt} M^{gt} - t^{gt} \right\|_1.$$

In order to learn accurate and photo-realistic textures, the disclosed texture inference network may be supervised with $L_1$ and adversarial losses (adv) on all texture maps including A, D, and S:

$$L_t = \sum_{T \in \{A,D,S\}} \| T - T^{gt} \|_1 + adv\,(T, T^{gt}).$$

Overall, train all modules may be jointly trained using a multi-task loss:

$$L = L_P + L_M + L_t$$

Experiment Setups

Implementation Details

In some embodiments, one or more operations described herein may be implemented in PyTorch. All the training and testing may be performed on NVIDIA V100 graphics cards in accordance with embodiments. In embodiments, the network parameters may be randomly initialized and may be trained using the Adam optimizer for 200,000 iterations with a learning rate set to $3 \times 10^{-4}$. For the recurrent face geometry optimizer, settings may include: the inference step to T=10, the grid resolution to r=3, the search radius to c=1 mm, and the loss weights of the head pose ($L_p$) and the position map ($L_M$) to 0.1 and 1, respectively, according to embodiments. For the texture inference network, three separate discriminators for A, S and D may be used in accordance with embodiments herein. The loss weight of the L1 and discriminators ($L_{adv}$) are set to 1 and 0.01, respectively, for example. The dimensions for the input image H, W and the UV maps $H_t$, $W_t$ are set to be 512. During training, eight camera views may be randomly selected for each scan, in accordance with embodiments. Such was found to be sufficient to train the network without data augmentation according to embodiments herein. The training process may take approximately 30 hours using 4 V100 graphics cards. During inference, arbitrary numbers of camera views may be used as input since the disclosed view aggregation function is not sensitive to the number of views. For inference with eight camera views, the disclosed network consumes approximately 2GB of GPU memory.

Qualitative Results

Figure 15:
FIG. 15 shows examples of rendered images using the disclosed reconstructed face assets in ReFA according to embodiments herein.

FIG. 15 shows examples of rendered images using the disclosed reconstructed face assets in ReFA, according to embodiments herein, from randomly selected testing data, including the input reference images, the directly inferred texture maps, and the renderings under different illuminations. Geometry constructed from the input images and the inferred appearance maps are used in the renderings with Maya Arnold under different lighting environments, e.g., provided HDRI images. The renderings achieve photo-realistic quality that faithfully recovers the appearance and expression captured in the input photos.

Figure 16:
FIG. 16 shows a detailed visualization of rows of inferred high-resolution texture maps according to embodiments herein.

In addition, FIG. 16 shows a detailed visualization of boxes with rows of inferred high-resolution texture maps (diffuse albedo, specular and displacement maps) according to embodiments herein. In embodiments, projecting extracted texture feature(s) includes warping and said feature warping is used to capture textures. In particular, the columns in FIG. 16 represent, respectively, 4×4 boxes of images that a reference image, (or zoomed reference image), a diffuse albedo map, a specular map, and a displacement map for that reference image. The even rows display the zoom-in images of the 4096×4096 texture maps. The disclosed texture inference network constructs texture maps from the multi-view images with high frequency details that essentially allow for photo-realistic renderings of the face assets.

Accordingly, ReFA is able to capture varying subjects and expressions, automatically producing precise and high-resolution face geometries and skin reflectance maps. The generated assets may be readily used in photorealistic rendering.

Figure 17:
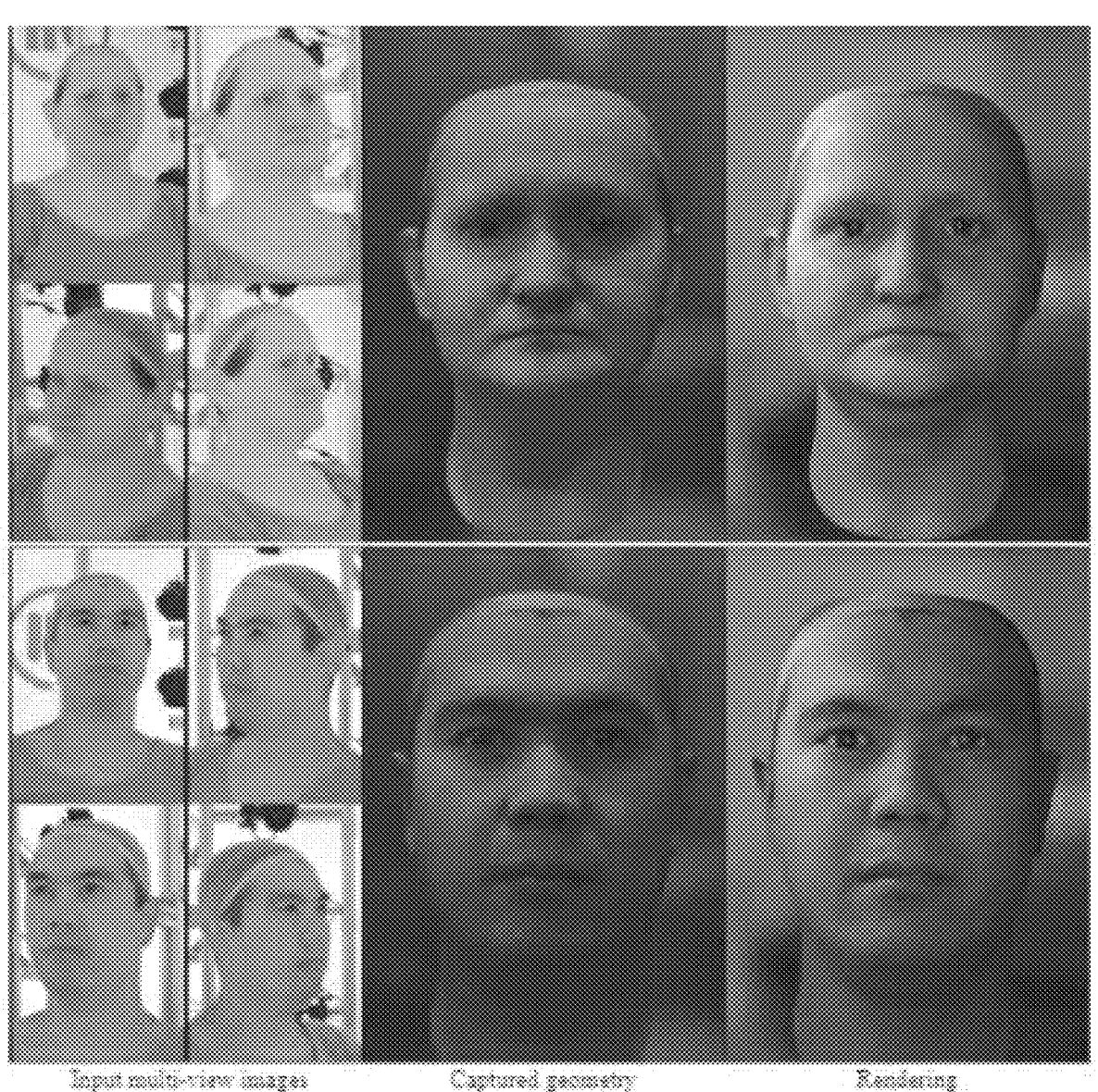
FIG. 17 shows exemplary testing results as produced by the disclosed model implementing a known prior art setting, which has different illumination and camera placements compared to the disclosed system, according to embodiments herein.

FIG. 17 shows exemplary testing results as produced by the disclosed model implementing a known prior art setting, which has different illumination and camera placements compared to the disclosed system, according to embodiments herein. In particular, the disclosed model was also tested on the Triple Gangers setting in FIG. 17, which has different illumination and camera placements compared to the disclosed system, as well as no polarizer and a lighting condition that is different than the disclosed training dataset. FIG. 17 indicates the generalization ability of the disclosed model to adapt to other settings and unseen multi-view dataset that has been captured in different settings.

A comparative evaluation to directly related baseline methods as well as an ablation study follows below. In addition, meaningful applications that ReFA enables are demonstrated.

To quantitatively evaluate the geometry reconstruction, in an embodiment, first convert the disclosed inferred position map may be converted to a mesh representation as described previously in the Preliminaries Section. Then, the scan-to-mesh errors may be computed using known method(s), with the exception that errors are computed on a full-face region including the regions of ear and neck. Both the mean and median errors may be measured as the main evaluation metrics, given that the two statistics tend to capture overall accuracy of the reconstruction models. To better quantize the errors for analysis, additionally shown below are the Cumulative Density Function (CDF) curves of the errors, which measure the percentage of point errors that falls into a given error threshold.

Comparisons

Baselines

The disclosed method regarding geometry accuracy is compared with three strong deep learning-based baselines from 3 different categories: (1) topologically consistent face inference network DFNRMVS from a sequence of images; (2) MYS networks DPSNet that is a representative depth estimation network that achieved state-of-the-art results on several MYS benchmarks; (3) topologically consistent multi-view face reconstruction network ToFU. The baseline results were obtained by running their publicly released codes with the 16-view image input and ground truth supervision from the disclosed prepared dataset (discussed in the previous Data Collection section).

Qualitative Comparison(s)

Figure 18:
FIG. 18 shows an example of a qualitative comparison between baselines and the disclosed testing dataset according to embodiments herein.

FIG. 18 shows an example of a qualitative, visual comparison of the reconstructed geometries between baselines and the disclosed testing dataset according to embodiments herein. Shown are rows of input images (a facial image and 4 alternative views provided in a first column) which are processed and output by DFNRMVS (second column), DPSNet (third column), ToFU (fourth column), and the disclosed ReFA method (fifth column), with a ground truth (sixth column). As the release codes of the baseline methods do not produce appearance maps, the results presented here are the network direct output geometry rendered with a basic shader using Blender. Visual inspection suffices to reveal the improvements ReFA may achieve: e.g., produces results that are more robust to challenging expressions (row 1,4,5), facial shapes (row 6,7) and reconstructs a wider face area including the ears and forehead when compared to prior art methods. Further, in FIG. 18, for a certain example (3rd row, 5th row, 6th row), the disclosed reconstructed faces faithfully resemble the ground truth appearances whereas the model-based methods (e.g., DFNRMVS, ToFU) display apparent errors in the overall facial shape and specific parts (see, e.g., eye size, jaw shape). Also, the disclosed reconstruction is more robust to challenging expressions: mouth funnel (1st row), cheek raising (4th row), lip stretching (7th row) and asymmetrical and non-linear mouth movement— mouth stretching to one side (5th row). Further, since ReFA focuses on a full-face reconstruction, certain prior art methods (e.g., DFNRMVS, ToFU) fail in reconstructing the ears of the subjects, whereas the disclosed ReFA method correctly infers the shape of the ears as seen from the input images. Last but not least, the disclosed results show the best geometry details, as the disclosed method captures the middle-frequency details where others fail, such as the wrinkle on the forehead of the 2nd and 4th row and the dimple on the face of the 2nd and 7th row. These are just some of the visual examples shown in FIG. 18 that represent improvements in face assets as provided by the disclosed method.

Figure 19:
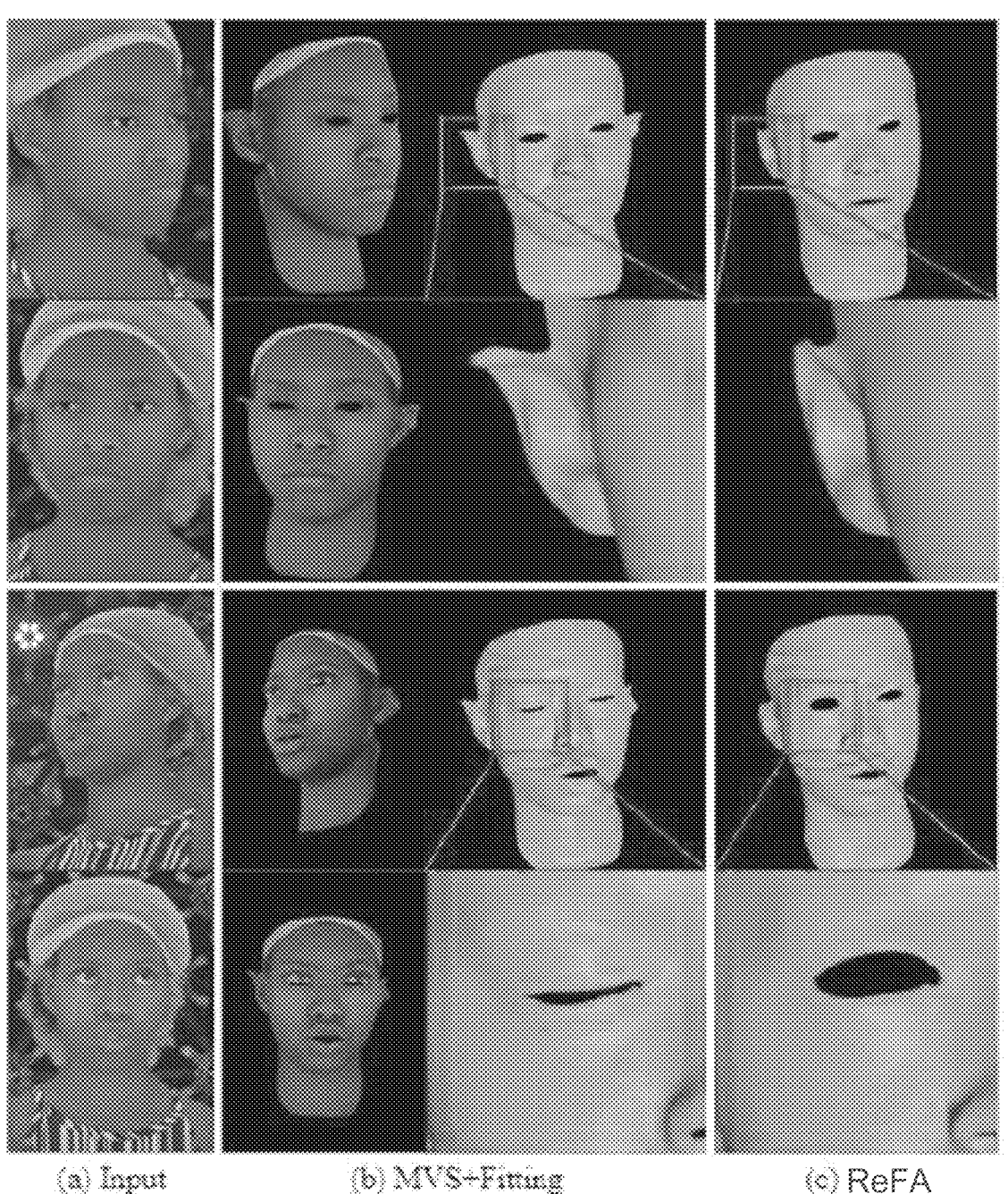
FIG. 19 shows a comparison between the disclosed method, ReFA, and the traditional face reconstruction and registration pipeline according to embodiments herein.

FIG. 19 shows a comparison between the disclosed method, ReFA, and the traditional face reconstruction and registration pipeline (described in the Data Collection Section) according to embodiments herein. In FIG. 19, the rows refer to (a) input images, as compared to a traditional MVS and fitting pipeline (b) and the disclosed ReFA method (c). In these cases of occlusion and noise, for example, due to hair occlusion (upper case) and the specific eye pose (lower case), the traditional pipeline struggles to either reconstruct the accurate face shape or fit the template face topology to the correct expressions. Specifically, the traditional pipeline (b) incorrectly reconstructs two challenging input examples as shown in the figure, e.g., pointy ear in the upper case due to hair occlusion, and closed eyes in the lower case.

The disclosed method and system not only correctly reconstruct such fine geometry details, but also at a significantly faster speed. In practice, the raw reconstruction from MVS algorithm contains a certain geometry noise, which requires manual clean-up by professional artists to remove the errors. In contrast, despite not being trained with these examples, the disclosed network manages to infer the correct shape automatically. It is believed that this is attributed to the learned data prior such as face semantic information from the training dataset. This validates that the disclosed system is more robust than the traditional pipeline in challenging and noisy situations.

Quantitative Comparisons

Figure 20:
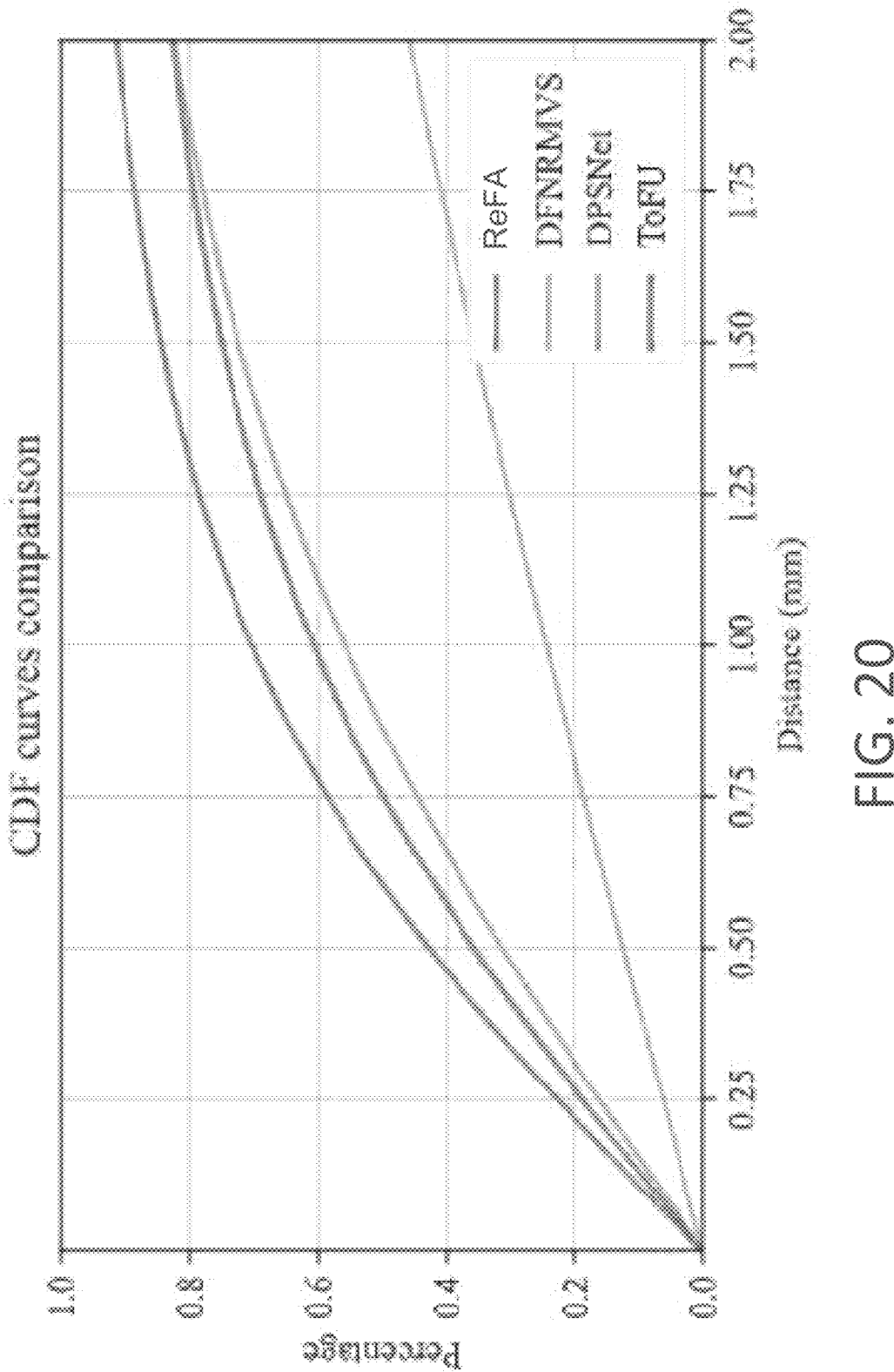
FIG. 20 shows the disclosed quantitative comparison and cumulative density function (CDF) curve of scan-to-mesh distance comparison with baseline methods on the disclosed test dataset, respectively, according to embodiments herein.

Table 4 (below) and FIG. 20 show the disclosed quantitative comparison and CDF curve comparison with the baseline methods on the disclosed test dataset, respectively, according to embodiments herein. The table measures the percentage of points that are within Xmm to the ground truth surface (column 1-3), mean and median scan-to-mesh errors (column 4-5), and a comparison of the supported features (column 6-8). "Topology" denotes whether the reconstructed mesh is topologically consistent. "Dense" denotes whether the model reconstructs geometry of more than 500k vertices, and "Texture" denotes whether the network output includes texture information. Although the original work of ToFU includes texture inference, the module is separate from its main architecture and thus not learned end-to-end.

FIG. 20 provides CDF curves comparison of the ReFA dataset and prior art methods, based on percentage v. distance (mm). As seen, ReFA outperforms the baselines in all metrics. Remarkably, ReFA achieves a median error of 0.608 mm, which outperforms the strongest baseline by 21%. In terms of recall, we observe that the disclosed model brings the best improvement in high-precision range, covering 22% more points within the 0.2 mm precision when compared to the best baseline. The improvement slightly decreases to 16.4% and 11.1% in the 1 mm and 2 mm thresholds, respectively. The increased accuracy of the disclosed model is augmented with the face that the disclosed model is the only neural-based face asset creation system that at the same time generates topologically consistent, dense and textured assets in an end-to-end manner (sec the right panel at Table 4).

TABLE 4

|  | <0.2 mm(%) | <1 mm(%) | <2 mm(%) | Mean (mm) | Med. (mm) | Topology | Dense | Texture |
|---|---|---|---|---|---|---|---|---|
| DFNRMVS | 4.935 | 24.287 | 45.393 | 3.544 | 2.254 | ✓ | ✓ | x |
| DPSN$_{ct}$ | 12.888 | 55.721 | 82.545 | 1.157 | 0.867 | x | ✓ | x |
| ToFU | 14.785 | 60.769 | 82.268 | 1.308 | 0.764 | ✓ | x | x |
| ReFA | 18.247 | 70.155 | 91.396 | 0.857 | 0.608 | ✓ | ✓ | ✓ |

Besides the accuracy, the disclosed system also runs significantly faster than previous works. Table 5 (below) shows inference time comparison. The traditional method(s) takes hours to process a single frame of a multi-view capture. Despite being accurate, the time consumption becomes tremendous for processing large scale data and performance sequences. Compared to previous deep learning based works, the disclosed system achieves significantly better accuracy while being 40% faster.

TABLE 5

| Method | Time (s) | FPS | Med. (mm) |
|---|---|---|---|
| Traditional | ≈30 min | — | — |
| DFNRMVS | 4.5 s | — | 2.254 |
| ToFU | 6.39 s | 2.6 | 0.764 |
| ReFA | 0.22 s | 4.5 | 0.608 |
| ReFA (small) | 0.11 s | 9 | 0.768 |

To draw a controlled comparison for showing the speed improvement, a smaller/lighter model has been designed by slightly modifying the disclosed network by: (1) using a light-weight feature extraction network; (2) reducing the searching grid dimension from r=3 to r=2; (3) reducing the UV space resolution to 128×128. As shown in Table 5, the disclosed model is both more efficient and more effective to the baselines at a 4.5 FPS speed. This smaller model achieves similar accuracy and model resolution as the previous state-of-the-art methods, while achieving an inference speed of 9 FPS, which is close to real-time performance.

Ablation Study

To validate the disclosed design choices, extensive ablation studies were conducted by altering the disclosed key building modules, including, but not limited to, 1) the choices of the correlation feature and the learned embedding feature, 2) the choices of view aggregation function and the search radius in computing the visual-semantic correlation, 3) the resolution of the UV map 4) removal of GRU in recurrent layer and 5) the number of input views. The detailed statistics of the ablation study is shown in Table 6 below.

TABLE 6

|  | Method | Mean (mm) | Med. (mm) |
|---|---|---|---|
| Correlation Feature | Correlation | 0.857 | 0.608 |
|  | Concat | 1.001 | 0.767 |
| View Aggr. Func. | Max | 0.867 | 0.608 |
|  | Mean | 1.083 | 0.829 |
|  | Var | 1.169 | 0.868 |
| Search Radius | 1 mm | 0.871 | 0.621 |
|  | 3 mm | 0.857 | 0.608 |
|  | 5 mm | 0.904 | 0.643 |
| UV-space Resolution | 512 | 0.857 | 0.608 |
|  | 256 | 0.877 | 0.624 |
|  | 128 | 0.976 | 0.879 |

TABLE 6-continued

|  | Method | Mean (mm) | Med. (mm) |
|---|---|---|---|
| Recurrent Layer | GRU | 0.857 | 0.608 |
|  | Conv. | 0.880 | 0.623 |
| UV-space Embedding | Network | 0.857 | 0.608 |
|  | Parameter | 0.942 | 0.763 |
| Input View | 16 | 0.857 | 0.608 |
|  | 8 | 0.911 | 0.644 |
|  | 6 | 0.938 | 0.664 |
|  | 4 | 1.028 | 0.735 |

Underlined items in Table 6 are the default settings. Correlation feature: whether use as default ("correlation") or simply concatenate the semantic and visual features ("concat"). View aggr func.: choice of the pooling function. Grid size: the total size length of the 3D grid built for computing correlation. Search radius: the search radius in computing the visual-semantic correlation. Recurrent Layer: whether GRU is used or is replaced by convolution layers. UV-space Embedding: whether the UV-space feature g is learned by a neural network ("Network") or directly set as learnable parameters ("Parameter"). Input View: number of views used as input in the inference.

Notably, decreasing the number of views for the inference results in a slight decrease in performance. The disclosed ReFA model's performance with only 4 views still achieve the best accuracy when compared to the best baseline that utilizes 16 views.

Correlation Features

Based on designs experimented in prior works, the correlation feature has been altered by directly concatenating the UV features and the multi-view image features ("concat" in the first row of Table 6), instead of computing their similarity through an inner product. This change has increased training difficulty and is shown to be less effective in the position matching task.

View Aggregation Function

Three different functions for fusing features across view, max pooling, mean pooling and standard deviation, are investigated and the results are shown in the second row of Table 6. It was found that the max aggregation function performs significantly better when compared to the others, although mean pooling is commonly utilized in other multi-view frameworks. It is believed that that the ability of max pooling to attend to the most salient views allows it to discard noise. The behavior also suggests a difference between the disclosed formulation of visual-semantic correlation features and the typical MVS network features, which are typically based solely on visual similarity. Max pooling is also more robust to scenarios where regions of the face are occluded in a certain view.

Search Radius in VSC

According to the result, the disclosed model achieves the best performance at a reasonable search radius of 3 mm, which is believed to be due to a smaller search radius which requires more update steps, while a larger search radius may lead to less prediction precision.

UV-Space Resolution

By default, in an embodiment, the UV-space resolution of the position map is set to be 512×512, which is equivalent to a dense mesh of approximately 260K vertices. In many practical situations, inference speed may be preferred over precision. Thus, the effectiveness of the disclosed system is investigated under various UV-space resolutions, including 512×512, 256×256 (≈65K vertices), and 128×128 (≈16K vertices). From the results it is observed that decreasing the UV-space resolution slightly decreases the performance. However, even under lowest UV-space resolution, the disclosed model still outperforms the baseline, as a 128×128 position map still encodes a denser mesh when compared to the parametric models utilized by the baselines. This validates the position map as a more advantageous representation in the face asset inference task.

Recurrent Layer

The effectiveness of the gated recurrent unit (GRU) module is investigated. GRU layers take the input of the current step and the hidden layer from the previous step as inputs, and outputs the updated hidden layer. The GRU layers are replaced with convolution layers. The results show that GRU performs significantly better than convolution. It is believed this is because GRU layers can better capture the long-term memory and converge the output to a fixed point.

UV Features

Figure 21:
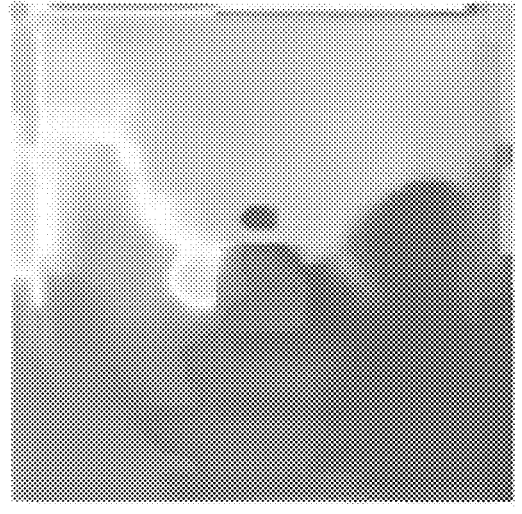
FIG. 21 shows results of an ablation study on the UV-space embedding network according to embodiments herein.
Figure 21:
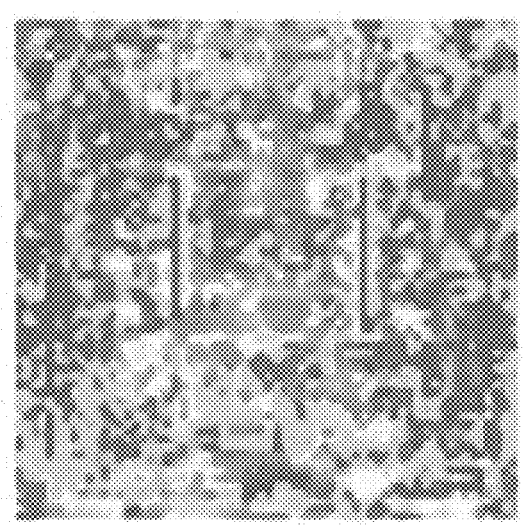

Directly using an embedding tensor as a learnable parameter for the UV features ("Parameter" in "learned embedding" in the third row of Table 6) instead of filtering the input UV maps with a neural network ("Network" in "learned embedding" in the third row of Table 6) has been tried. This drastically increases the number of parameters that need to be trained and, due to its poor regularization, the performance under such design decreases slightly. To better understand the effectiveness of the learned embedding network, the UV features of both designs are visualized with T-SNE to embed the feature to the 3-dimension space, as shown in FIG. 21. Specifically, FIG. 21 shows the ablation study on the UV-space embedding network, namely: (a) the disclosed UV-space features along with a neural network; and (b) directly setting the UV-space feature as a learnable parameter. It may be observed that both feature maps exhibit symmetry property and regional distribution that complies with the actual face region. However, a Learned embedding produces much better regularized feature maps, which validates the effectiveness of the disclosed UV-space embedding network.

Number of Views

Decreasing the number of capture views needed to faithfully reconstruct a face asset is essential for supporting a light-weighted capturing system. The benefits from fewer view come in twofold: on one hand, obviously, the capturing system needs fewer cameras. On the other hand, the saving on storage space needed for the raw data is quite significant—approximately 2 terabytes of storage space may be free if only half of the 16 cameras are needed for a 10 minutes video of a subject.

The fifth row of Table 6 shows the disclosed model's performance given different number of views as input. While the performance decreases the less the available views, reducing 16 views to 6 views only resulted in a 9% increase in median error and the achieved precision is enough for use in a professional setting (<1 mm). Reducing to 4 views comes with a 20% increase in median error. However, even the 4-view reconstruction with the disclosed model outperforms all compared baselines that utilize 16-view input (see Table 4). These results provide a practical solution to reconstructing face assets from sparse views, where a traditional acquisition algorithm would struggle.

Applications

Avatar Creation

Animation sequences using the avatar directly generated from our pipeline without any manual tweaking have been shown.

Performance Capture

Figure 22:
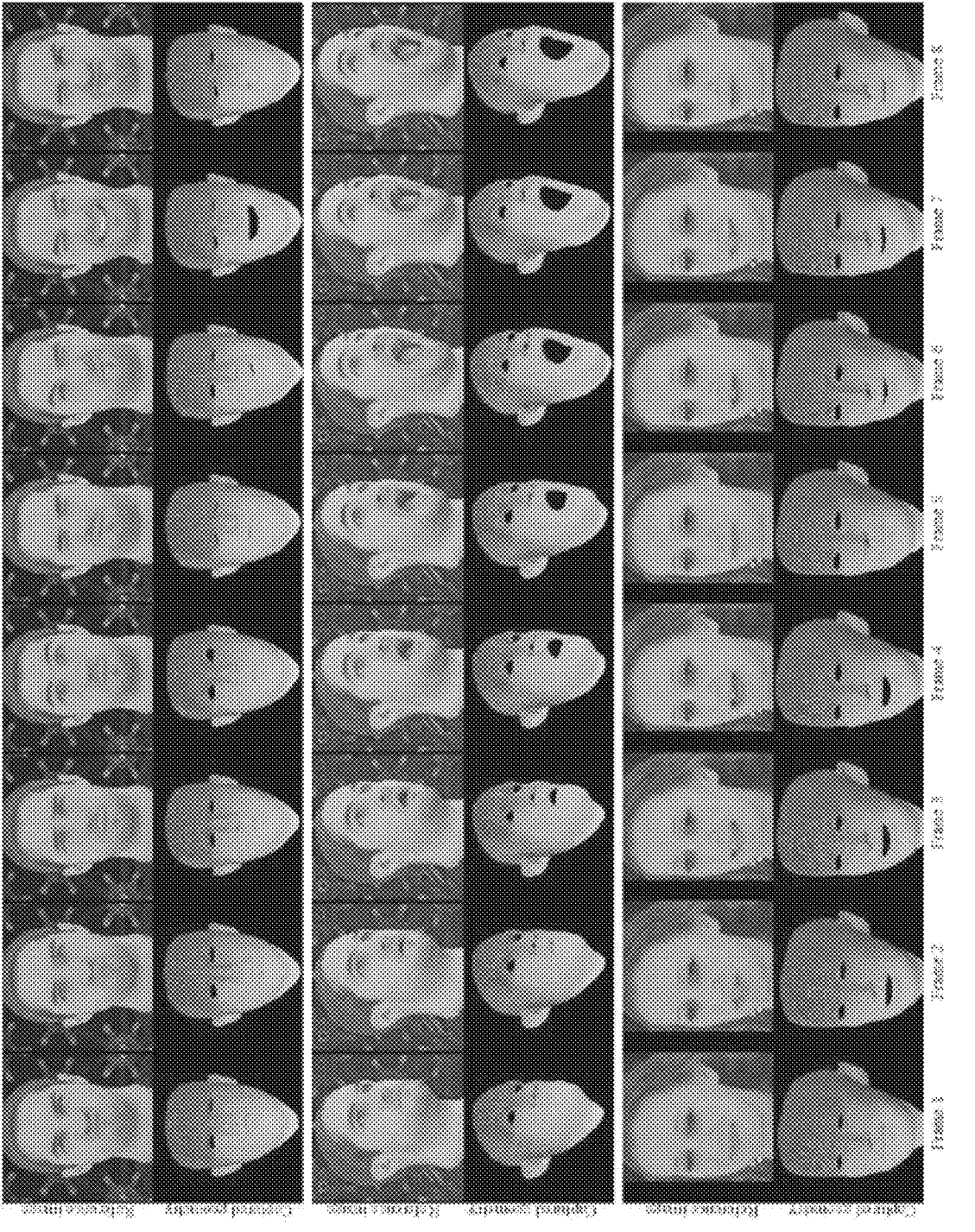
FIG. 22 shows rows and columns of reconstruction of a video sequence according to embodiments herein.

Fast geometry inference is a notable strength of the disclosed model. In embodiments, the disclosed small model (128×128 resolution) achieves a close-to-real-time performance at 9 FPS. The efficiency reveals the potential application of the disclosed model in neural-based performance capture. Two dynamic video sequences at 4.5 FPS of unseen subjects in FIG. 22 are demonstrated, where only 8 camera views are used, showing the expression and the head pose of the subject as it changes over time. Both the input images and the reconstructed meshes (converted from inferred output) are visualized. Importantly, the reconstructed meshes arc color-mapped by the UV coordinates. The accurate reconstruction together with the color mapping demonstrates that the disclosed system is capable of capturing accurate face geometry from a video sequence while maintaining correspondences across the captured shapes. It is believed that this application is a showcase of the readiness of the disclosed system for performance capture in the digital industry.

Extended Representation

Figure 23:
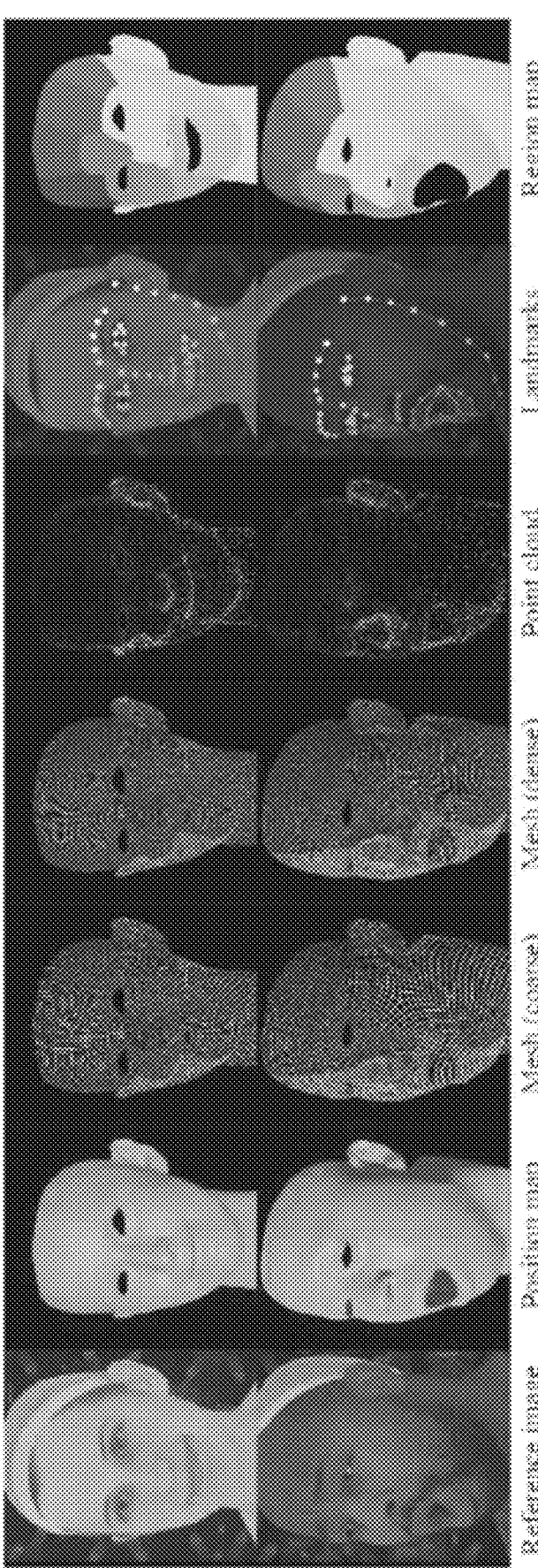
FIG. 23 shows rows and columns of different use cases for the position map representation being converted to various representations, according to embodiments herein.

The UV-space position map offers significant flexibility in supporting various types of output. FIG. 23 shows rows and columns of different use cases for the position map representation being converted to various representations, according to embodiments herein, where the same position map is shown converted to meshes of various densities, point cloud, Landmarks and region segmentation maps. Given valid UV mappings, the position map representation is amenable to conversions to various representations, as shown in each column. Specifically, the disclosed position map may be converted to different mesh topologies seamlessly as long as a solid UV mapping is provided. This include 3D meshes of different subdivisions, which enables Level of Detail (LOD) rendering, where faces of different detail levels are needed in real-time applications. In addition, by choosing specific points in the UV space, point cloud, Landmarks and region maps representations can be extracted from the potential maps, which are suitable for many mobile applications.

Compared to one state-of-the-art method, ReFA boosts both the accuracy by 20% to a median error of 0.608 mm, and a 40% increase in speed, inferring high-quality textured shapes at 4.5 FPS. The face geometries inferred by ReFA not only outperforms the known deep MVS method(S), but they are reconstructed at a topologically consistent representation that provides dense correspondences across subjects and expressions. In addition, a parallel texture inference network that shares the same representation with the geometry produces a full set of high-resolution appearance maps that allow for photo-realistic renderings of the reconstructed face.

The present systems and methods provide end-to-end prior-free framework that performs explicit reasoning over the pixel-level correspondences and symmetries to predict a complete set of face assets from a single image. The end-to-end design enables the network to learn semantic feature descriptors that are robust to illumination, camera pose and expression. In accordance with an embodiment, with only 164 training subjects, this disclosure has demonstrated that the results are generalizable. Generated geometries and textures maps may be used by professional photo-realistic rendering pipelines. Further, the disclosed dataset, systems, and methods may benefit the field of human digitization and/or other fields, including those pertaining to reproducing images.

Herein has been presented an end-to-end neural face capturing framework, ReFA, that effectively and efficiently infers dense, topologically consistent face geometry and high-resolution texture maps that are ready for production use and animation. The disclosed model tackles the challenging problem of multi-view face asset inference by utilizing a geometry representation, the UV-space position map, and a recurrent face geometry optimizer that iteratively refines the shape and pose of the face through an alignment between the input multi-view images and the UV-space features. Experiment results have demonstrated that the disclosed design choices allow ReFA to improve upon previous neural-based methods and achieve the state-of-the-art results in accuracy, speed and completeness of the shape inference. In addition, the disclosed model is shown to be device-agnostic to various capture settings, including sparse views and views under different lighting conditions, with little compromise taken on its performance. It is believed that the progress made opens up ample opportunities for rapid and easily accessible face acquisition that meets the high demand for face asset capturing in the digital industry.

The disclosed current network is not originally designed for performance capture, as it is trained with a database consisting of static scans. This work may be to extend the disclosed design to specifically process video sequences for performance capturing. It is believed that features specifically designed for temporal integration may enhance the speed and temporal consistency based on what the disclosed current fran1ework can achieve. The disclosed approach may be extended to a single-view setting, or the more challenging setting where the input is in-the-wild. As occlusion and noise may become a major obstacle in limiting the performance of a single-view reconstruction algorithm, it is believed that leveraging additional priors, such as symmetry assumption on the face, may also be explored.

Figure 24:
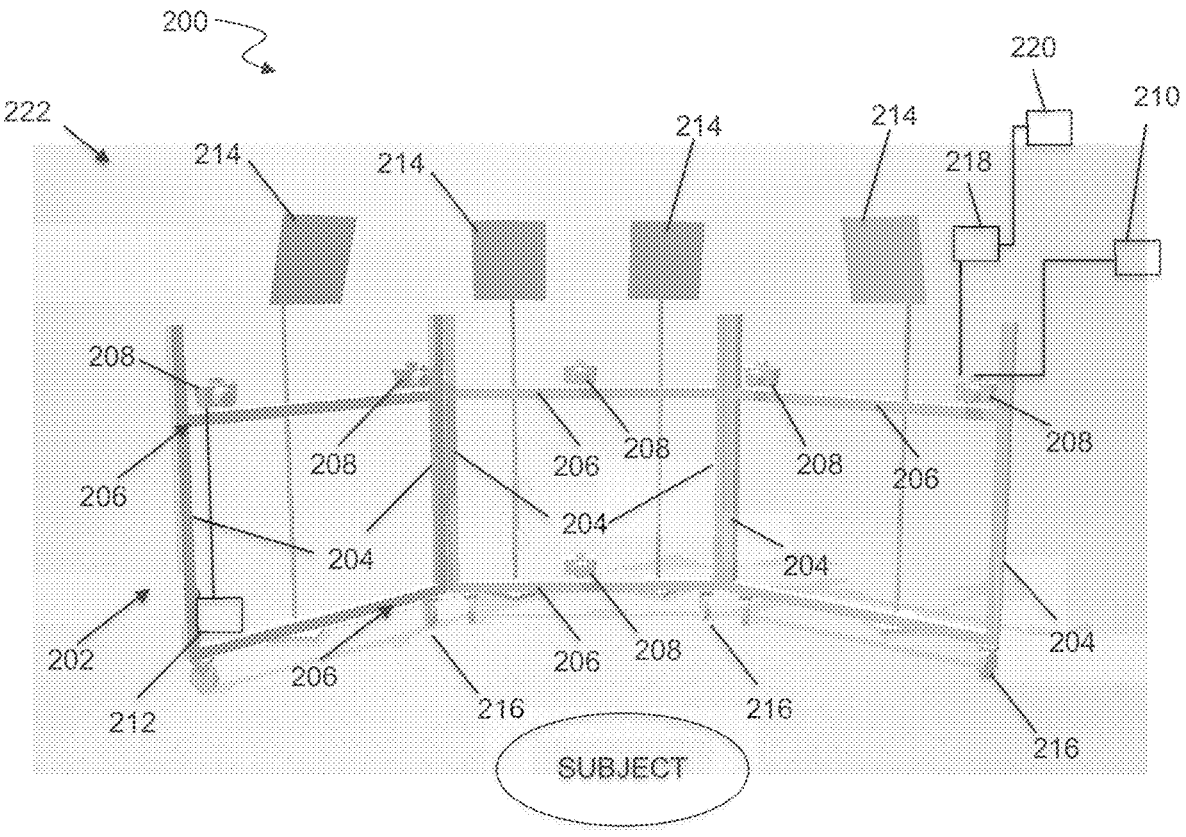
FIG. 24 shows an exemplary system for obtaining images according to embodiments herein.

FIG. 24 shows an exemplary system 200 for obtaining images of a subject according to embodiments herein. In a non-limiting embodiment, the system 200 is a structural system assembled and configured for obtaining multi-view images for use in the aforementioned ReFA process, for example. Of course, the system 200 may also be used to obtain a single image as described with reference to the disclosed DIFF process.

According to embodiments, the system 200 includes a modular frame assembly 202, in the form of a frame or similar structure, for enclosing a 180 degree area, i.e., around a subject or person. The modular frame assembly 202 includes at least two vertical support members 204 and at least two horizontal support members 206. According to embodiments herein, there may be at least a first horizontal support member provided at a first horizontal position and at least a second horizontal support member provided at a second horizontal position. That is, the horizontal support members 206 may be spaced relative to one another at different horizontal positions in a vertical direction, i.e., at different heights. In an embodiment, that at least two horizontal support members 206 extend between and are connected to the at least two vertical support members 204. In embodiments, two or more cameras 208 are provided on the first horizontal support member 206 and a single camera 208 is provided on the at least a second horizontal support member 206.

In embodiments, the modular frame assembly 202 includes three modular frame structures hingedly connected together (by hinges or similar devices) for adjustment around the 180 degree area and subject. Further, in embodiments, the modular frame assembly 202 may include a number of caster wheels 216 thereon for manipulating the frame structure(s). In an embodiment, the frame assembly 202 has a set of three modular frames, each frame comprising two vertical support members and two horizontally spaced support members. In one embodiment, wherein three modular frames are provided, at least two cameras are provided on first horizontal support members along the first horizontal position and a single camera is provided on second horizontal support members along the second horizontal position. In a particular non-limiting embodiment, the single camera may be provided on a middle or center second horizontal support member.

According to embodiments herein, the support members are rods or tubes that are joined together.

Multiple cameras 208 may also be provided on the modular frame assembly 202. The cameras 208 are configured to receive power from a power source 210. Further, at least one interval timer 212 may be connected to the cameras 208. The power source 210 and interval timer(s) 212 are schematically represented in FIG. 24 and should be understood to include connection of each of the cameras 208 thereto. The system 200 also includes a lighting system with multiple light boxes 214, according to embodiments herein. Each light box 214 may be spaced relative to the modular frame assembly 202 about the 180 degree area for lighting the subject from multiple directions. In embodiments, a blackout curtain 222 may be provided to surround the modular frame assembly 202 for limiting and/or preventing interference from environmental and/or external light sources.

Moreover, at least one programmable processor 220 connected to cameras 208. In embodiments, the cameras 208 may be connected to a hub 218 which connects to the at least one processor. In accordance with embodiments, processor 220 is the previously described processor PRO (PRO-1 and PRO-2) of FIG. 1 and configured to perform the aforementioned processes, steps, and features, alone or as part of the computer system CS. The at least one programmable processor 220 is schematically represented in FIG. 24 and should be understood to include connection of each of the cameras 208 thereto (directly or indirectly, e.g., via hub 218 or similar device). According to embodiments, the at least one programmable processor 220 is configured to: provide a reference as a template, the reference containing a 3D mesh that represents an item and a UV texture mapping that maps each point on the 3D mesh to a 2D UV space, the item comprising a median face, vertex positions or surface points; receive one or more input images in an image space of a face; extract geometry feature and texture feature in the image space; extract features in a UV space; iteratively compute or produce a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state; and output a pose in a canonical space of the 3D mesh and UV-space map for the one or more input images, wherein each pixel in the UV-space map stores a coordinate of a corresponding point in the canonical space of the 3D mesh. That is, in embodiments, the at least one processor 220 is configured to perform the disclosed DIFF method or technique. In embodiments, the at least one processor 220 is configured to perform the disclosed ReFA method or technique.

In use, upon activation of the interval timer(s) 212, the cameras 208 are directed to obtain one or more images of the subject and communicate with the at least one programmable processor 220.

In an particular, non-limiting embodiment, the system 200 may be an eight (8) T-slotted 2 in×2 in Aluminum rig enclosing a 180 degree area divided into three longitudinal sections. In embodiment, the sections may have dimensions of 49 in×52 in, for example, and 2 latitudinal levels made portable with two (e.g., 5 in) caster wheels carrying each section. The top level may have 5 Canon EOS Rebel 3Ti cameras featuring a fine-detail CMOS sensor with approx. 18.0 effective megapixels, DIGIC 4, high-precision and high-speed 9-point AF, approx. 3.7 FPS continuous shooting with Canon EF 50 mm f1.8 lenses attached them, according to embodiments. The bottom level has just one (1) of these camera-lens pair attached, according to embodiments. The cameras may be attached to the rig by ball joint mounts for easy framing of the subject, for example. According to embodiments, all the cameras may be powered on by AC adapters connected to a power strip. In an embodiment, the interval timer(s) 212 is provided in the form of 2.5 mm intervalometer jacks which are connected together [and with the cameras] for synchronized image captures through a trigger switch. USB ports on the cameras may be connected to a USB-hub and fed to a Dell XPS 17 laptop with Intel i9-12900HK processor with 64 GB RAM and RTX3060 graphic card through the USB port for live-view monitoring through the digiCamControl software, according to embodiments herein. In particular, the devices are configured for framing and focusing of the subject who is lit by the lighting system, in an embodiment. In embodiments, the lighting system includes four 85 W soft box lighting setup with 5500K temperature light bulbs spread around behind the rig so as to light the subject evenly from all directions. The whole rig may be surrounded, according to embodiments herein, by black curtains on a circular ring supported by poles with a flatbase so that the subject is lit only by the defined light sources and there is no interference of external light, for example.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A method for constructing a 3D face model, the method comprising:

providing a reference as a template, the reference containing a 3D mesh that represents an item and a UV texture mapping that maps each point on the 3D mesh to a 2D UV space, the item comprising a median face, vertex positions or surface points;

receiving one or more input images in an image space of a face;

extracting geometry feature and texture feature in the image space;

extracting features in a UV space;

iteratively computing or producing a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state;

outputting a pose in a canonical space of the 3D mesh and a UV-space position map for the one or more input images, wherein each pixel in the UV-space position map stores a coordinate of a corresponding point in the canonical space of the 3D mesh, wherein the geometry feature is utilized to fit a 6-DoF rigid transformation that represents the output pose in the canonical space of the 3D mesh and the UV-space position map, and optimizing a head pose and/or facial geometry into the 6-DoF rigid transformation and the UV-space position map, said optimizing comprising:

fixing the position map to be a mean face geometry of the 3D mesh of the reference and updating the 6-DoF rigid transformation using a first number iterations;

updating both the 6-DoF rigid transformation and the UV-space position map for a second number of iterations; and fixing the 6-DoF rigid transformation and updating the UV-space position map using a third number of iterations.

2. The method according to claim 1, wherein the reference is a reference face model or a position map.

3. The method according to claim 1, wherein the received one or more input images comprises multi-view input images.

4. The method according to claim 1, wherein the outputted pose is a camera pose or a head pose.

5. The method according to claim 1, wherein the feature map is a correlation feature map.

6. The method according to claim 1, wherein the method further comprises utilizing the texture feature for producing an albedo map, a specular map, and a displacement map.

7. The method according to claim 6, wherein the projecting the extracted texture feature comprises warping and said feature warping is used to capture textures and high frequency details of the face of the input image.

8. The method according to claim 1, wherein the iteratively computing or producing the feature map comprises using a geometry decoding network to process a hidden vector and compute a geometry update tuple comprising a quaternion for correcting the output pose, and an offset for correcting the UV-space map.

9. The method according to claim 8, wherein the quaternion is a predicted quaternion.

10. The method according to claim 8, wherein the computing of the geometry update tuple comprises, for each pixel in the UV space, enumerating a multi-scale grid around the 3D position of each pixel, projecting grid points to the image space using pose or camera parameters, and comparing corresponding points between the geometry feature and the UV feature to calculate visual semantic similarities, wherein the camera parameters comprise camera rotation and a predicted vector for correcting the camera translation.

11. The method according to claim 1, wherein the reference comprises a dataset acquired by a Light Stage scan system that employs photometric stereo in combination with polarization promotion to facilitate pore level accuracy in both geometry reconstruction and reflectance maps.

12. The method according to claim 11, wherein a camera setup of the light stage scan system comprises 25 machine vision cameras, including 17 monochrome cameras to achieve more efficient capture and higher-resolution results, allowing for sub-millimeter geometry details, albedo, and specular reflectance reconstruction, and eight color cameras, which aid in stereo base mesh reconstruction.

13. The method according to claim 11, wherein the dataset includes around 30,000 4K×4K multiview images and processed geometry in sub-millimeter accuracy and consistency, and skin reflectance (albedo and specularity) corresponding to each image.

14. A non-transitory machine-readable medium storing instructions which, when executed by at least one programmable processor, cause the at least one programmable processor to perform operations comprising:

providing a reference as a template, the reference containing a 3D mesh that represents an item and a UV texture mapping that maps each point on the 3D mesh to a 2D UV space, the item comprising a median face, vertex positions or surface points;

receiving one or more input images in an image space of a face;

extracting geometry feature and texture feature in the image space;

extracting features in a UV space;

iteratively computing or producing a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state;

outputting a pose in a canonical space of the 3D mesh and a UV-space position map for the one or more input images, wherein each pixel in the UV-space position map stores a coordinate of a corresponding point in the canonical space of the 3D mesh, wherein the geometry feature is utilized to fit a 6-DoF rigid transformation that represents the output pose in the canonical space of the 3D mesh and the UV-space position map, and optimizing a head pose and/or facial geometry into the 6-DoF rigid transformation and the UV-space position map, said optimizing comprising:

fixing the position map to be a mean face geometry of the 3D mesh of the reference and updating the 6-DoF rigid transformation using a first number iterations;

updating both the 6-DoF rigid transformation and the UV-space position map for a second number of iterations; and fixing the 6-DoF rigid transformation and updating the UV-space position map using a third number of iterations.

15. A system comprising:

at least one programmable processor;

a non-transitory machine-readable medium storing instructions which, when executed by the at least one programmable processor, cause the at least one programmable processor to perform operations comprising:

providing a reference as a template, the reference containing a 3D mesh that represents an item and a UV texture mapping that maps each point on the 3D mesh to a 2D UV space, the item comprising a median face, vertex positions or surface points;

receiving one or more input images in an image space of a face;

extracting geometry feature and texture feature in the image space;

extracting features in a UV space;

iteratively computing or producing a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state;

outputting a pose in a canonical space of the 3D mesh and a UV-space position map for the one or more input images, wherein each pixel in the UV-space position map stores a coordinate of a corresponding point in the canonical space of the 3D mesh, wherein the geometry feature is utilized to fit a 6-DoF rigid transformation that represents the output pose in the canonical space of the 3D mesh and the UV-space position map, and optimizing a head pose and/or facial geometry into the 6-DoF rigid transformation and the UV-space position map, said optimizing comprising:

fixing the position map to be a mean face geometry of the 3D mesh of the reference and updating the 6-DoF rigid transformation using a first number iterations;

updating both the 6-DoF rigid transformation and the UV-space position map for a second number of iterations; and fixing the 6-DoF rigid transformation and updating the UV-space position map using a third number of iterations.

16. A system for obtaining images of a subject for constructing a 3D face model, the system comprising:

a modular frame assembly for enclosing a 180 degree area, the modular frame assembly comprising at least two vertical support members and at least two horizontal support members, a first horizonal support member being provided at a first horizontal position and at least a second horizontal support member being provided at a second horizontal position;

a plurality of cameras provided on the modular frame assembly, said plurality of cameras being configured to receive power from a power source;

at least one interval timer connected to said plurality of cameras;

a lighting system comprising a plurality of light boxes, each light box spaced relative to the modular frame assembly about the 180 degree area for lighting the subject from multiple directions, and at least one programmable processor connected to said plurality of cameras, wherein, upon activation of said at least one interval timer, said plurality of cameras are directed to obtain one or more images of the subject and communicate with the at least one programmable processor, and wherein said at least one programmable processor is configured to:

provide a reference as a template, the reference con-
taining a 3D mesh that represents an item and a UV
texture mapping that maps each point on the 3D
mesh to a 2D UV space, the item comprising a
median face, vertex positions or surface points;
receive one or more input images in an image space of
a face;
extract geometry feature and texture feature in the
image space;
extract features in a UV space;
iteratively compute or produce a feature map via visual
semantic correlation between the UV space and the
image space and regress geometry updates, including
projecting or providing the extracted texture feature
to the UV space to predict texture maps and comparing said features to the reference, and inputting
the computed or produced feature map to an RNN-
based neural optimizer composed of Gated Recur-
rent Units (GRU) to determine a hidden state;
output a pose in a canonical space of the 3D mesh and
a UV-space position map for the one or more input
images, wherein each pixel in the UV-space position
map stores a coordinate of a corresponding point in
the canonical space of the 3D mesh, wherein the
geometry feature is utilized to fit a 6-DoF rigid
transformation that represents the output pose in the
canonical space of the 3D mesh and the UV-space
position map, and
optimizing a head pose and/or facial geometry into the
6-DoF rigid transformation and the UV-space position map, said optimizing comprising:
fixing the position map to be a mean face geometry
of the 3D mesh of the reference and updating the
6-DoF rigid transformation using a first number
iterations;
updating both the 6-DoF rigid transformation and the
UV-space position map for a second number of
iterations; and
fixing the 6-DoF rigid transformation and updating
the UV-space position map using a third number of iterations.
17. The system according to claim 16, wherein two or
more cameras are provided on the first horizonal support
member and a single camera is provided on the at least a
second horizontal support member.
18. The system according to claim 16, wherein the modu-
lar frame assembly comprises three frame structures
hingedly connected together for adjustment around the 180
degree area.
19. The system according to claim 16, further comprising
a blackout curtain surrounding the modular frame assembly
for limiting and/or preventing interference from environ-
mental and/or external light sources.
20. A method for constructing a 3D face model, the
method comprising:
providing a reference as a template, the reference con-
taining a 3D mesh that represents an item and a UV
texture mapping that maps each point on the 3D mesh
to a 2D UV space, the item comprising a median face,
vertex positions or surface points;
receiving one or more input images in an image space of
a face;
extracting geometry feature and texture feature in the
image space;
extracting features in a UV space;
iteratively computing or producing a feature map via
visual semantic correlation between the UV space and the image space and regress geometry updates, includ-
ing projecting or providing the extracted texture feature
to the UV space to predict texture maps and comparing
said features to the reference, and inputting the com-
puted or produced feature map to an RNN-based neural
optimizer composed of Gated Recurrent Units (GRU)
to determine a hidden state; and
outputting a pose in a canonical space of the 3D mesh and
a UV-space map for the one or more input images,
wherein each pixel in the UV-space map stores a
coordinate of a corresponding point in the canonical
space of the 3D mesh,
wherein the iteratively computing or producing the fea-
ture map comprises using a geometry decoding net-
work to process a hidden vector and compute a geom-
etry update tuple comprising a quaternion for
correcting the output pose, and an offset for correcting
the UV-space map,
wherein the computing of the geometry update tuple
comprises, for each pixel in the UV space, enumerating
a multi-scale grid around the 3D position of each pixel,
projecting grid points to the image space using pose or
camera parameters, and comparing corresponding
points between the geometry feature and the UV fea-
ture to calculate visual semantic similarities, wherein
the camera parameters comprise camera rotation and a
predicted vector for correcting the camera translation.
21. A non-transitory machine-readable medium storing
instructions which, when executed by at least one program-
mable processor, cause the at least one programmable pro-
cessor to perform operations comprising:
providing a reference as a template, the reference con-
taining a 3D mesh that represents an item and a UV
texture mapping that maps each point on the 3D mesh
to a 2D UV space, the item comprising a median face,
vertex positions or surface points;
receiving one or more input images in an image space of
a face;
extracting geometry feature and texture feature in the
image space;
extracting features in a UV space;
iteratively computing or producing a feature map via
visual semantic correlation between the UV space and
the image space and regress geometry updates, includ-
ing projecting or providing the extracted texture feature
to the UV space to predict texture maps and comparing
said features to the reference, and inputting the com-
puted or produced feature map to an RNN-based neural
optimizer composed of Gated Recurrent Units (GRU)
to determine a hidden state; and
outputting a pose in a canonical space of the 3D mesh and
a UV-space map for the one or more input images,
wherein each pixel in the UV-space map stores a
coordinate of a corresponding point in the canonical
space of the 3D mesh,
wherein the iteratively computing or producing the fea-
ture map comprises using a geometry decoding net-
work to process a hidden vector and compute a geom-
etry update tuple comprising a quaternion for
correcting the output pose, and an offset for correcting
the UV-space map,
wherein the computing of the geometry update tuple
comprises, for each pixel in the UV space, enumerating
a multi-scale grid around the 3D position of each pixel,
projecting grid points to the image space using pose or
camera parameters, and comparing corresponding
points between the geometry feature and the UV feature to calculate visual semantic similarities, wherein the camera parameters comprise camera rotation and a predicted vector for correcting the camera translation.

22. A system comprising:

at least one programmable processor;

a non-transitory machine-readable medium storing instructions which, when executed by the at least one programmable processor, cause the at least one programmable processor to perform operations comprising:

providing a reference as a template, the reference containing a 3D mesh that represents an item and a UV texture mapping that maps each point on the 3D mesh to a 2D UV space, the item comprising a median face, vertex positions or surface points;

receiving one or more input images in an image space of a face;

extracting geometry feature and texture feature in the image space;

extracting features in a UV space;

iteratively computing or producing a feature map via visual semantic correlation between the UV space and the image space and regress geometry updates, including projecting or providing the extracted texture feature to the UV space to predict texture maps and comparing said features to the reference, and inputting the computed or produced feature map to an RNN-based neural optimizer composed of Gated Recurrent Units (GRU) to determine a hidden state; and outputting a pose in a canonical space of the 3D mesh and a UV-space map for the one or more input images, wherein each pixel in the UV-space map stores a coordinate of a corresponding point in the canonical space of the 3D mesh, wherein the iteratively computing or producing the feature map comprises using a geometry decoding network to process a hidden vector and compute a geometry update tuple comprising a quaternion for correcting the output pose, and an offset for correcting the UV-space map, wherein the computing of the geometry update tuple comprises, for each pixel in the UV space, enumerating a multi-scale grid around the 3D position of each pixel, projecting grid points to the image space using pose or camera parameters, and comparing corresponding points between the geometry feature and the UV feature to calculate visual semantic similarities, wherein the camera parameters comprise camera rotation and a predicted vector for correcting the camera translation.

\* \* \* \* \*